United States Patent
Kocher et al.

(10) Patent No.: US 6,640,305 B2
(45) Date of Patent: *Oct. 28, 2003

(54) DIGITAL CONTENT PROTECTION METHOD AND APPARATUS

(75) Inventors: Paul C. Kocher, San Francisco, CA (US); Joshua M. Jaffe, San Francisco, CA (US); Benjamin C. Jun, Palo Alto, CA (US)

(73) Assignee: Cryptography Research, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/948,473

(22) Filed: Sep. 6, 2001

(65) Prior Publication Data

US 2002/0099948 A1 Jul. 25, 2002

Related U.S. Application Data

(63) Continuation of application No. 09/389,268, filed on Sep. 2, 1999, now Pat. No. 6,289,455.

(51) Int. Cl.$^7$ .............................. H04L 9/10; H04L 9/24
(52) U.S. Cl. ...................... 713/194; 713/162; 713/172; 380/228; 380/286
(58) Field of Search .............................. 713/155, 159, 713/162, 163, 168, 171, 172, 174, 176, 185, 201; 380/228, 279, 281, 286; 705/51, 64, 65, 66, 67

(56) References Cited

U.S. PATENT DOCUMENTS

| | | | |
|---|---|---|---|
| 4,222,068 A | 9/1980 | Thompson | 358/120 |
| 4,521,852 A | 6/1985 | Guttag | 364/200 |
| 4,521,853 A | 6/1985 | Guttag | 364/200 |
| 4,613,901 A | 9/1986 | Gilhousen et al. | 358/122 |

(List continued on next page.)

OTHER PUBLICATIONS

Chor, B et al., "Tracing Traitors," *Advances in Cryptology*, CRYPTO '94 (Springer–Verlag, 1994), pp. 257–270.

"H'Cards and you: The 'H' Card Hacking FAQ," by an Anonymous Member of TCUP, revision date Aug. 10, 1998, world wide web at http:/www.dr7.com/faqs/dsstech-faq.html, pp. 1–38.

(List continued on next page.)

*Primary Examiner*—Justin T. Darrow
(74) *Attorney, Agent, or Firm*—Joseph Yang; Skadden, Arps

(57) ABSTRACT

Before use, a population of tamper-resistant cryptographic enforcement devices is partitioned into groups and issued one or more group keys. Each tamper-resistant device contains multiple computational units to control access to digital content. One of the computational units within each tamper-resistant device communicates with another of the computational units acting as an interface control processor, and serves to protect the contents of a nonvolatile memory from unauthorized access or modification by other portions of the tamper-resistant device, while performing cryptographic computations using the memory contents. Content providers enforce viewing privileges by transmitting encrypted rights keys to a large number of recipient devices. These recipient devices process received messages using the protected processing environment and memory space of the secure unit. The processing result depends on whether the recipient device was specified by the content provider as authorized to view some encrypted digital content. Authorized recipient devices can use the processing result in decrypting the content, while unauthorized devices cannot decrypt the content. A related aspect of the invention provides for securing computational units and controlling attacks. For example, updates to the nonvolatile memory, including program updates, are supported and protected via a cryptographic unlocking and validation process in the secure unit, which can include digital signature verification.

29 Claims, 11 Drawing Sheets

U.S. PATENT DOCUMENTS

| | | | |
|---|---|---|---|
| 4,634,808 A | 1/1987 | Moerder | 178/22.14 |
| 4,696,034 A | 9/1987 | Wiedemer | 380/16 |
| 4,887,296 A | 12/1989 | Horne | 380/21 |
| 5,029,207 A | 7/1991 | Gammie | 380/10 |
| 5,237,610 A | 8/1993 | Gammie et al. | 380/10 |
| 5,293,424 A | 3/1994 | Holtey et al. | 380/23 |
| 5,436,621 A | 7/1995 | Macko et al. | 340/825.44 |
| 5,442,704 A | 8/1995 | Holtey | 380/23 |
| 5,592,552 A | 1/1997 | Fiat | 380/21 |
| 5,619,247 A | 4/1997 | Russo | 348/3 |
| 5,754,647 A | 5/1998 | Hsu | 380/4 |
| 5,757,919 A | 5/1998 | Herbert et al. | 380/25 |
| 5,764,762 A | 6/1998 | Kazmierczak et al. | 380/4 |
| 5,774,546 A | 6/1998 | Handelman et al. | 380/4 |
| 5,799,080 A | 8/1998 | Padmanabhan et al. | 380/4 |
| 5,802,274 A | 9/1998 | Dorak et al. | 395/186 |
| 5,809,140 A | 9/1998 | Rubin et al. | 380/21 |
| 5,825,878 A | 10/1998 | Takahashi et al. | 380/4 |
| 5,852,290 A | 12/1998 | Chaney | 235/492 |
| 5,892,899 A | 4/1999 | Aucsmith et al. | 395/186 |
| 5,892,900 A | 4/1999 | Ginter et al. | 395/186 |
| 5,923,759 A | 7/1999 | Lee | 380/25 |
| 5,982,899 A | 11/1999 | Probst | 380/25 |
| 5,999,623 A | 12/1999 | Bowman et al. | 380/20 |
| 6,009,177 A | 12/1999 | Sudia | 380/25 |
| 6,041,412 A | 3/2000 | Timson et al. | 713/200 |
| 6,044,155 A | 3/2000 | Thomlinson et al. | 380/49 |
| 6,049,608 A | 4/2000 | Ablowitz et al. | 380/28 |
| 6,069,957 A | 5/2000 | Richards | 380/281 |
| 6,240,188 B1 * | 5/2001 | Dondeti et al. | 380/259 |
| 6,266,420 B1 * | 7/2001 | Langford et al. | 380/277 |
| 6,289,455 B1 * | 9/2001 | Kocher et al. | 380/228 |
| 6,330,671 B1 * | 12/2001 | Aziz | 380/239 |
| 6,373,948 B1 * | 4/2002 | Wool | 380/205 |
| 6,393,128 B1 * | 5/2002 | Rix et al. | 380/205 |

OTHER PUBLICATIONS

Kommerling, O. and Kuhn, M. "Design Principles for Tamper–Resistant Smartcard Processors," USENIX Workshop on Smartcard Technology, May 10–11, 1999, *USENIX Association*, pp. 9–20, ISBN 1–880446–34–0, pp. 1–12.

McCormac, J. *"European Scrambling Systems,"* (Circuits, Tactics and Techniques, 5), Waterford University Press, 1996 [copy not transmitted herewith per Examiner Justin Darrow's instructions].

* cited by examiner

FIGURE 1 [BACKGROUND ART]

DIGITAL CONTENT PROTECTION METHOD AND APPARATUS

This application is a continuation of U.S. application Ser. No. 09/389,268, filed Sep. 2, 1999, now U.S. Pat. No. 6,289,455 B1, which is hereby incorporated by reference in its entirety.

FIELD OF THE INVENTION

The present invention relates to systems for distributing digital content, and more specifically to methods and apparatuses for improving the security of systems for distributing digital content.

BACKGROUND OF THE INVENTION

Introduction

Systems that protect valuable content require effective security. For content distributed in physical form, such as film being transported to movie theaters, physical security measures can be sufficient. Unfortunately, traditional physical security techniques are slow, expensive, cumbersome, and cannot be used with non-physical content distribution models. As a result, content providers rely on cryptographic hardware to ensure that only authorized users can access their data.

To prevent misuse of decryption keys, cryptographic hardware used to manage content decryption keys must be tamper-resistant. Building effective tamper resistant hardware has proven extremely difficult, especially for systems that are the subject of determined attacks, because they are large or protect high-value content. As a result, many systems (including most satellite television systems) use replaceable security devices, such as smartcards, so that security can be re-established after an attack without replacing the entire playback system. Nevertheless, smartcards used for prepaid telephone, pay-TV, and transit applications are broken regularly. For example, prepaid telephone cards used in Germany were attacked in 1998 with estimated losses of US$38 million ("Pirates Cash in on Weak Chips," Wired News, May 22, 1998). Similarly, access cards and systems for cable and prepaid satellite television services are regularly "hacked," necessitating repeated costly card replacements.

Smartcards must resist a variety of attacks against cryptographic algorithms, protocols, software, and chip hardware. Unfortunately, designing a smartcard that implements sophisticated protocols yet contains no security flaws has proven to be a very difficult task, since unexpected problems or errors in any portion of the design can render the entire card insecure. Cost considerations also favor attackers, since smartcards typically cost between $1 and $15, yet may be trusted to protect services or information worth thousands of dollars.

A smartcard system will only be attacked seriously if it is in the attacker's interest to break it. With smartcard designs of the background art, once attackers develop a means to compromise one card, the incremental cost to break a large number of cards is usually very small. As a result, smartcard security efforts typically focus on preventing the initial attack by making the card more difficult to break. For example, vendors try to increase the cost of reverse-engineering the device or imaging the card's ROM. Such techniques are helpful because they increase the cost required to break the system the first time, but for very large systems they are ineffective because attackers will devote enough effort to attacks that they will eventually succeed.

Prepayment and Post-Payment

In many systems of the background art, digital content is distributed in encrypted form. Access to the keys or algorithms required to decrypt the content is regulated by a rights management system that enforces the content owner's access policies. These access policies vary greatly in complexity. For example, the simplest schemes simply involve providing a decryption key upon payment, while the approaches described in U.S. Pat. No. 5,915,019 to Ginter et al. provide for rather sophisticated and flexible distribution mechanisms.

The two most common payment methods present in such schemes are prepayment and post-payment. Because these approaches have different security requirements, their architectures and typical requirements will be described separately.

In prepayment schemes, the user obtains prior authorization from the content provider. In typical prepayment systems, the user provides a payment (or a commitment to pay) then receives a content decryption key that allows access to the purchased content.

Prepayment systems must be able to resist a variety of attacks. One class of attacks involves directly breaking the encryption (or any other protection mechanisms used to prevent unauthorized use of the content). Another attack involves capturing and redistributing the digital content after it has been decrypted. Other attacks involve unauthorized redistribution of the content decryption keys. Still other attacks involve capturing the content in analog form (e.g., as it is presented to the user).

Some of these attacks can be prevented effectively and others do not present a serious financial threat to content distributors. Strong encryption algorithms (such as triple DES) can reliably thwart attackers who do not have the correct decryption keys. Attacks against the decrypted content are not very serious if the content's value decreases rapidly with time or if the re-recording process significantly degrades the quality of the content. Watermarking techniques can also prevent, detect or trace some content recording attacks. Attacks that involve copying decryption keys are serious and have proven challenging to prevent. Because it is usually impossible or too expensive to transmit a different ciphertext to each potential user, attackers can purchase a decryption key once, then redistribute it to unauthorized parties.

Systems known in the background art distribute content decryption keys in encrypted form to a tamper-resistant cryptographic unit connected to (or part of) the user's playback device. Because decryption keys with long-term value are never exposed in unencrypted form, many attacks can be prevented—if the tamper-resistant module is unbreakable.

Because smartcards and other tamper-resistant cryptographic hardware commonly used to implement the cryptographic unit often have limited performance and bandwidth, the cryptographic unit is often used to generate short-lived subkeys from the main content decryption key. These subkeys are then transmitted to a less secure portion of the system, such as the main playback device, and used to decrypt the content itself.

The security of the system thus depends on the security of the cryptographic unit. If the cryptographic unit is compromised, attackers can determine the decryption keys and algorithms and use these to access content without authorization (e.g. by emulating an authorized cryptographic unit and/or the entire playback device).

In post-payment schemes, the user can decide to access some content without notifying the content provider or obtaining permission in advance. Instead, the content provider later audits the user's usage and determines the appropriate fees to charge. In some systems of the background art, post-payment is referred to as pay-per-view.

In addition to being susceptible to the attacks described above against prepayment systems, post-payment schemes are vulnerable to a variety of additional attacks. For example, the user's purchase audit records must be stored until the content provider retrieves them. Modification or destruction of these records can make it impossible for the content provider to determine the correct amount to charge. As a result, secure storage is required in the cryptographic unit for the audit data.

Although cryptographic techniques can secure the audit data from tampering (provided that the cryptographic unit has not been compromised), users generally do have the ability to prevent the audit process altogether. For example, in many consumer systems, two-way communication requires a telephone call, which users can prevent by simply disconnecting the telephone line. Users can often even destroy the cryptographic unit to conceal their purchases. As a result, measures are generally required to make users allow audits. For example, it is possible to penalize users by terminating service or preventing access to additional postpayment (pay-per-use) content if successful audits are not performed in a timely manner. Back-end systems can also charge users with penalties or other fees for audit noncompliance.

Post-payment systems involve more risk because purchases occur without live interaction with the content provider. As a result, each cryptographic unit must be preprogrammed with the cryptographic keys for viewing all content the user might possibly purchase. As a result, compromise of a single cryptographic module can potentially compromise all post-payment content in a system.

Many systems combine prepayment and post-payment approaches. Prepayment is generally used to regulate access to content sold on a subscription basis. For example, access to electronic news services, music channels, subscription television channels, etc. are commonly sold on a prepayment basis. Premium content is often provided on a post-payment (pay-per-use) basis, where users can use content at any time but their cryptographic modules periodically provide the content provider with a list of the premium content that has been used. Post-payment of this type is used in the "Divx" video playback system as well as most cable and satellite television "pay-per-view" schemes. Prepayment protocols can be used for extremely high value pay-per-view content if penalties are insufficient to ensure successful auditing or if the risks are great enough to offset the cost and effort to initiate two-way communication with the content provider before access is authorized.

The Cryptographic Rights Unit (CRU)

A variety of designs and architectures have been proposed and used for cryptographic units that manage and protect the secret keys and algorithms used in content distribution systems. If legitimate users can be trusted to protect their keys, software-only approaches can be acceptable and have the advantage of avoiding the cost and expense of building and distributing specialized hardware. In many cases, however, tamper-resistant modules are required.

No architecture can provide perfect security. For example, an exact replica of an authorized satellite television receiver (including the receiver's cryptographic rights unit) will be able to view the same signals as the original. As a result, the security depends on preventing attackers from building working copies or emulators of authorized playback devices.

Commercially-deployed approaches usually use tamper-resistant hardware modules to enforce the content provider's access policies. FIG. 1 shows a smartcard of the background art for regulating access to encrypted content. The exemplary system includes three types of memory 110: ROM 115, EEPROM 125, and RAM 120. Each type of memory has advantages and disadvantages. ROM is fast and inexpensive, but cannot be modified and can often be read using advanced imaging techniques. RAM is fast and can be updated quickly, but loses its contents when power is lost. EEPROM retains its contents even when power is disconnected, but is relatively expensive to manufacture and is quite slow to modify.

The ROM and/or EEPROM generally include software, which is executed by microprocessor 140. The software includes instructions that implement and/or manage protocols and cryptographic keys involved in decrypting content. Because cost, memory, and I/O bandwidth limits make it difficult to decrypt a large amount of data in the tamper-resistant module, the tamper-resistant module can supply content decryption keys for individual blocks or streams of content to the playback system, which performs the bulk data decryption. A cryptographic processor 150 can optionally assist with the cryptographic computations by reducing the amount of time or program code required for the computation or by implementing obfuscated algorithms that are difficult to reverse engineer.

To support both prepayment and post-payment, at least four basic operations are supported over I/O interface 145: adding new prepaid rights keys or privileges, recording purchases (for post-payment), deriving content decryption keys (for either prepayment or post-payment), and post-payment auditing.

The device of FIG. 1 can potentially be attacked in a variety of ways. Attackers typically begin by extracting the software code from one device using any of a wide variety of techniques, such as physically imaging a chip or modifying a target chip using ion beam lithography. Although many techniques for performing the ROM and/or EEPROM extraction are relatively expensive, the operation only has to be performed once, since all units in the system normally have the same or similar software. Some techniques, such as tamper-resistant chip coatings, memory encryption, etc. can complicate memory extraction attacks, but such techniques are expensive to implement and only increase the cost for performing the software extraction.

Once the software is known, attackers can reverse engineer the code, yielding all cryptographic algorithms and keys contained in the extracted regions. Again, some techniques, such as the use of obfuscated or nonstandard software, can complicate this process somewhat.

If cryptographic processor 150 is not present, the attacker can then produce an emulator of the target device. Once an emulator has been developed, it is often difficult for the provider of the system to re-establish security without replacing all CRUs. Even if legitimate devices are configured to allow updates to the portions of their software or keys in EEPROM, the emulator will simply accept the same updates and continue operating unless the content provider manages to identify the compromised keys and stop providing service to the corresponding accounts.

If the emulator is imperfect and legitimate devices are configured to allow software updates, it may be possible to modify legitimate devices in a way that the emulator will not process correctly. Unfortunately, all the attacker has to do is correct the emulator. For example, pirates have produced CRU emulators that operate a personal computer and updated their emulator software to fix any errors in the emulator's operation.

Code update capabilities are a double-edged sword—although they can thwart some attacks, attackers may be able to subvert them to inject malicious code into legitimate devices. Although code updates can be protected with digital signatures and/or MACs (Message Authentication Codes), attacks against the hardware, software, and/or cryptography pose a significant risk. It may also be possible for attackers to insert code in other ways, for example by exploiting pointer errors to redirect memory updates to code regions.

For example, if the attacker is able to trick microprocessor 140 into executing malicious (i.e., attacker-written) code, then the attacker can use the first code to load more malicious code into EEPROM 125 or RAM 120. This malicious code can then further modify the device, for example by adding unauthorized functions that bypass non-cryptographic protections delete post-payment audit records, add/modify/output cryptographic keys such as rights keys, etc. Although some techniques (such as hashing EEPROM contents as part of key derivation processes) have been attempted to detect some such attacks, these techniques tend not to be very effective and have been evaded by clever attackers. Although it would be possible to make microprocessor 140 execute only code from ROM 115, the system designers would then be unable to patch problems or transmit code updates to address bugs.

It is extremely difficult or impossible to reliably prevent all major attacks using architectures of the background art. Once attackers reverse engineer the software executed by microprocessor 140, they can identify and exploit software flaws or other implementation weaknesses. If these weaknesses in turn allow unauthorized modification of the device's software, the content provider's own cryptographic rights units (CRUs) and/or playback hardware can even be used to attack the system. The book *European Scrambling Systems 5* by John McCormac (Baylin Publications, 1996) contains more information about how some existing systems have been designed and attacked and why architectures of the background art have proven ineffective.

Using architectures of the background art; any weakness in the cryptographic unit thus tends to cause a serious compromise of the entire device. Building a device that resists all known invasive and non-invasive hardware attacks, software attacks, protocol attacks, cryptographic attacks, fault induction attacks, etc. is extremely difficult—and new attacks may be discovered after a device is deployed. As a result, many content providers suffer from high piracy rates and the expense of replacing cryptographic units when they are broken.

SUMMARY OF THE INVENTION

The present invention can improve the security of systems used to distribute and protect digital content. One embodiment of the invention, in a tamper-resistant device for regulating access to encoded digital content, includes an external interface, a microprocessor for controlling the external interface, a memory, a cryptographic unit connected between the microprocessor and memory configured to protect the memory from the microprocessor by cryptographically transforming data communicated between the microprocessor and the memory, and a device key accessible by the cryptographic unit and inaccessible by the microprocessor. The device is configured such that the cryptographic unit uses the contents of the memory to transform at least one data value received from the microprocessor, where the result of the transformation is required to decode the digital content.

Although it is impossible to design a content distribution system that is immune to all possible piracy attacks, the main objective of the present invention is to minimize the probability that attackers will profit from attacks. A system does not need to be immune to all attacks; attackers are generally rational and driven by a profit motive, so illogical attacks will not proliferate widely. For example, if the attacker's cost and risk exceed the cost of purchasing the content legitimately, piracy is not a serious threat.

Attackers have both advantages and disadvantages as compared to legitimate service providers. Because their acts are often illegal, they incur higher risks. Their distribution costs and customer acquisition costs tend to be higher, since they generally cannot use traditional (legitimate) channels. The quality and reliability of pirate services also tends to be inferior. On the other hand, attackers have several major advantages. Most important, they obtain their content for free (i.e., by pirating it). In many cases they also co-opt part or all of a content provider's distribution channel (e.g., sales of encrypted optical discs, satellite broadcasts, Internet services, etc.), playback mechanisms (cable TV set-top boxes, DVD players, etc.), and other infrastructure. Finally, pirates' customers may be able to avoid cumbersome procedures imposed by the legitimate content provider for security, billing, etc.

Although attacker business models vary, the present invention is based on the premise that content providers can effectively eliminate piracy by making it unprofitable. It is thus an objective of the present invention to increase the costs and risks incurred by attackers who steal content.

The present invention is also based on the premise that content providers will only invest in anti-piracy measures that make business sense. When estimating the cost of content piracy to content providers, several factors that must be considered. Direct revenue losses occur when potential subscribers instead buy pirated content. In cases where content providers subsidize the costs of media, distribution, playback hardware, technical support, etc., illegitimate users can also increase expenses. If piracy is widespread, content providers may be unable to obtain premium content or will have to pay more to content owners to compensate them for lost royalties. Costs for enforcement and prosecution can also be significant. Paying users may even feel discouraged if they see others getting for free what they are paying for, reducing the perceived value of a service. It is thus a primary objective of the present invention to achieve improved security without unduly increasing costs or hassles for content providers or legitimate users.

Traditional content protection schemes generally seek to maximize the cost of any unauthorized access, but do little to increase the cost of decoding messages once the decryption scheme has been broken. In addition to preventing attacks the present invention also seeks to minimize the proliferation of unauthorized decoding devices if an attack does occur, since the damage due to piracy increases with the number of unauthorized users. It is thus an objective of the present invention to maximize the cost of producing multiple unauthorized pirate devices even after one device has been compromised. This objective is attained in part by forcing attackers to repeat complex and expensive physically-invasive attacks for each pirate device that is produced.

DETAILED DESCRIPTION OF THE INVENTION

Figure 1:
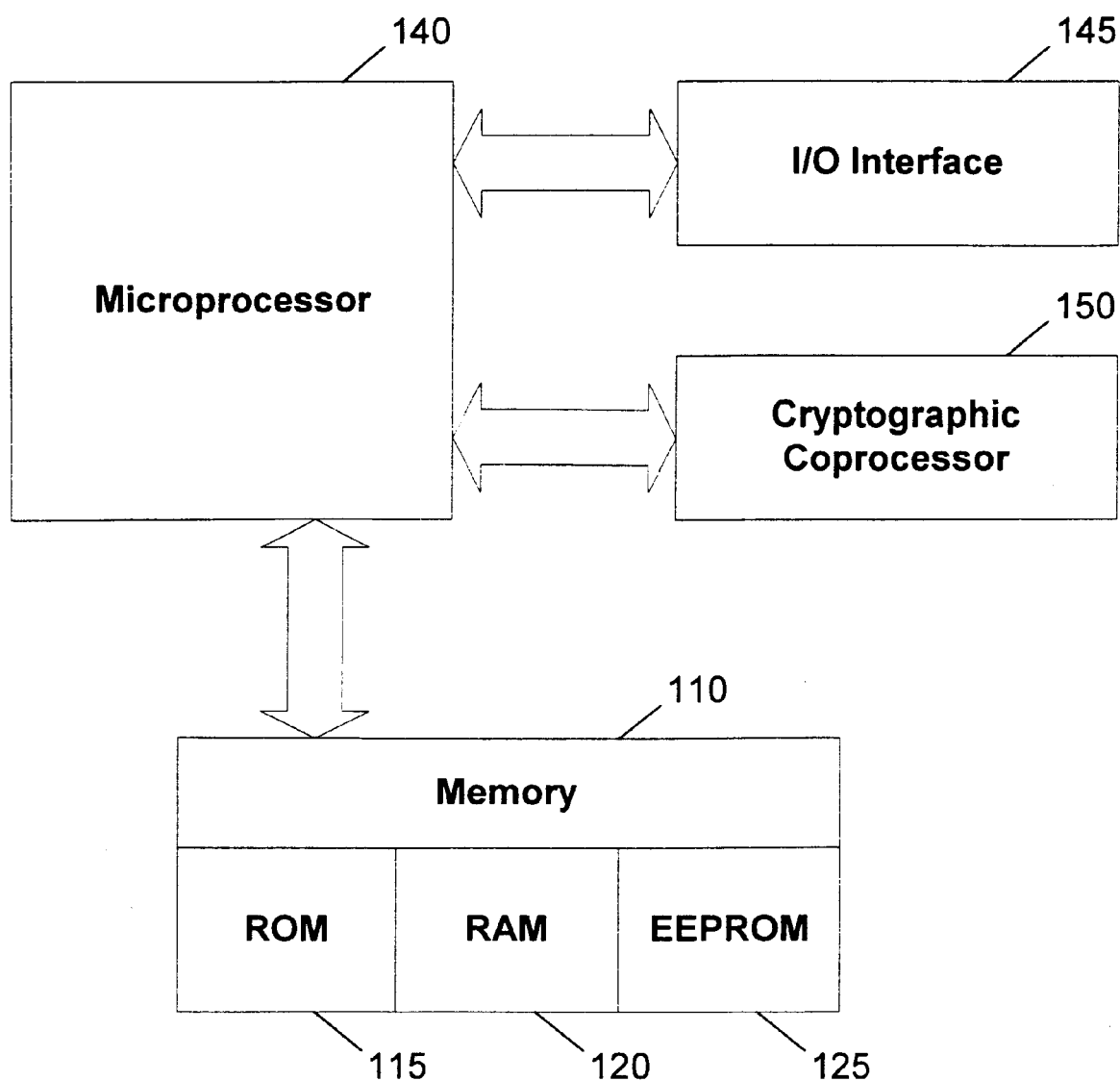
FIG. 1 shows a smartcard of the background art for regulating access to encrypted content.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention.

Definitions

Asymmetric Function: An easy-to-compute function for which a complementary operation (such as its inverse) is computationally hard without a private key, but easy to compute with the private key. The RSA cryptosystem is thought to be asymmetric, since inverting the public key operation (i.e., performing the private key operation) is only easy with if the private key is known.

Content Decryption Key (CDK): A key required to decrypt some encrypted digital content.

Content Provider: An entity that manages the cryptographic portions of a content distribution system. The content provider is also generally responsible for distributing or broadcasting the content, billing, customer service, etc. The content provider tasks can be divided among many companies.

CryptoFirewall: A specialized circuit placed between the interface control processor (ICP) and a protected memory which is designed to control access to (and use of) the protected memory even if the ICP is compromised. In addition, the CryptoFirewall uses the protected memory to derive content decryption keys.

Cryptographic Rights Unit (CRU): A tamper-resistant hardware device designed to perform cryptographic operations that allow authorized users to gain access to digital content.

Device key: A cryptographic key or other security-related parameter that is preferably specific to a particular device, but may also be shared by a small number of similar devices.

Digital content: A digital representation of human-interpretable material, such as pictures, audio tracks, video segments, text (such as books, magazines, news feeds, stock quotes, etc.), etc. Digital content is often encrypted and/or compressed and may include error correcting codes and other auxiliary data.

Interface Control Processor (ICP): A microprocessor responsible for processing communications between the cryptographic rights unit and a playback device. The ICP is also generally responsible for communicating with the CryptoFirewall.

ISO 7816 Smartcard: A device complying with at least the physical dimensions and contact configurations specified in ISO standard 7816-1 and 7816-2. Smartcards are commonly used to implement CRUs, as they provide a reasonable degree of tamper resistance at relatively low cost.

Key Derivation Message (KDM): A message generated by a content provider to allow a CRU to derive a decryption key corresponding to some digital content. KDMs are usually transmitted with the corresponding content.

Playback Device: A device that receives digital content via an untrusted mechanism (such as radio, optical disc, digital audio tape, cable, satellite broadcast, Internet connection, etc.) and, using a CRU, decodes the content. The bulk data decryption operation can be performed by the CRU itself or by the playback device using a key generated by the CRU.

Pseudoasymmetric Function: A function (transformation) designed such that attackers cannot easily perform the inverse transformation even with direct access to the forward transformation. For example, an attacker with access to a pseudoasymmetric encryption function does not necessarily have the ability to decrypt meaningful messages. Unlike traditional asymmetric cryptographic functions, however, the noninvertability of a pseudoasymmetric function relies on the difficulty of completely reverse engineering the "public" function instead of the difficulty of performing a mathematically hard operation such as factoring. A block cipher implementation with a physically-protected key and/or algorithm that only supports encryption is an example of a pseudoasymmetric function, since unrestricted access to the encryption operation alone does not allow decryption of messages.

Rights Enablement Message (REM): A message generated by a content provider that gives a CRU the ability to access new content. The REM itself is usually transmitted via the same untrusted mechanism as the content itself, although in some cases REMs may be exchanged through other channels (such as separate telephone or Internet connections).

Rights Key: A value (such as a cryptographic key) that allows a CRU to generate or decode the decryption keys for some content. Rights keys are generally required to decrypt KDMs and obtain content decryption keys.

Tamper-Resistant Device: A hardware device whose operation is relatively difficult to monitor and/or modify. Examples of tamper-resistant devices include without limitation PCMCIA cards filled with epoxy, circuits covered with tamper-resistant coatings, circuits wrapped in tamper-detecting wire, integrated circuits (which are tamper resistant due to their small feature size), and circuits in enclosures that detect opening.

System Architecture

Figure 2:
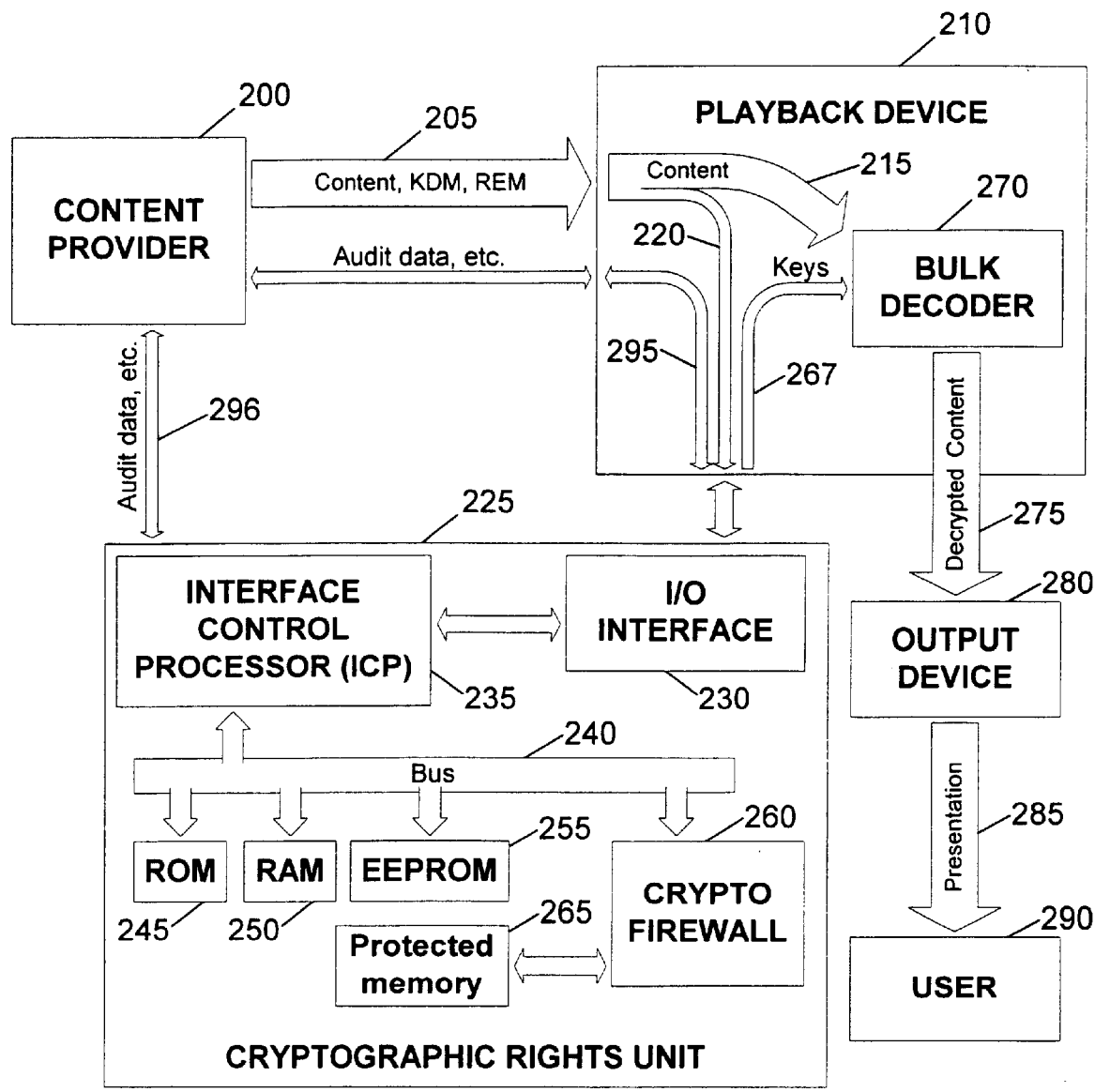
FIG. 2 shows an exemplary system using the Cryptographic Rights Unit (CRU) of the present invention.

FIG. 2 shows an exemplary system using the Cryptographic Rights Unit (CRU) of the present invention. Content Provider 200 obtains content and prepares it for distribution, for example by-compressing and encrypting content data, multiplexing multiple content streams, and adding control messages such as KDMs and REMs. (A more detailed explanation of the content preparation process is provided in the section below entitled "Preparing Content.")

The encrypted content data is then distributed (process 205) by the Content Provider in a manner such that it can be received by authorized (e.g., paying) users as well as potential attackers. A variety of distribution methods may be employed, including without limitation distribution of physical media (such as optical discs), radio or satellite transmission, wired networks (such as telephone, ADSL, cable television, etc.), and distribution over computer networks (such as publication on a web site, multicast, etc.)

Playback device 210 receives the distributed data for some content to be decoded. In the exemplary embodiment shown in FIG. 2, Key Distribution Messages (KDMs) and Rights Enablement Messages (REMs) are distributed with content 205. Playback device 210 thus separates the desired content 215 and control messages 220 in the received data.

In the exemplary embodiment, control messages 220 include Key Derivation Messages (KDMs) and Rights Enablement Messages (REMs). These messages are transferred by playback device 210 to Cryptographic Rights Unit (CRU) 225. Playback device 210 can optionally perform processing or filtering before sending messages to CRU 225.

CRU 225 includes an interface control processor (ICP) 235, which is responsible for communication with playback device 210 via I/O interface 230. In addition, CRU 225 includes several types of memory connected to interface control processor 235 via bus 240. In particular, fixed data and code are stored in ROM 245, temporary data (and possibly code) are stored in RAM 250, and additional code and/or data are stored in EEPROM 255 which can be modified by processor 235. Also attached to bus 240 is CryptoFirewall 260, a specialized cryptographic processing unit whose operation is explained in detail below. CryptoFirewall 260 regulates and cryptographically modifies data written to or read from protected memory 265.

To decode some content, playback device 210 transmits to interface 230 a KDM corresponding to some content 215 to be decoded. Interface control processor 235 receives the KDM and, as described below, uses CryptoFirewall 260 to derive one or more content decryption keys 267, which are transferred to bulk decoder 270 via playback device 210. With the correct keys 267, bulk decoder 270 can correctly decrypt content 215. The decrypted content 275 is then sent to an output device 280, which presents the content to user 290 by converting it into a human-readable form (process 285). For example, if the system is configured to play audio content, decrypted content 275 could be an analog or digital representation of a sound, and output device 280 could be an amplifier and speakers. Similarly, if the system is configured to play movies on a television set, bulk decoder 270 could perform decryption and MPEG decompression, outputting decrypted content 275 as an NTSC-compatible video signal so that output device 280 can be an ordinary television set.

A communication channel from CRU 225 to content provider 200 is also provided for auditing post-payment purchases. This channel can also be used for transmitting REMs, other usage data, code updates, etc. Communication from the CRU to the content provider can be direct 296 or (more commonly) indirect 295, e.g. passing through playback device 210 which can (for example) establish a connection with content provider 200 as needed. Any communication method (including without limitation modem, radio, satellite, cable, etc.) can be employed.

CryptoFirewall Operation

The CryptoFirewall cryptographically regulates access to a protected memory. Unlike conventional memory encryption devices (such as the encrypted memory device of U.S. Pat. No. 5,442,704 to Holtey), the CryptoFirewall does not act transparently or allow arbitrary read or write operations to be performed by the microprocessor. In particular, the CryptoFirewall does not need to provide the microprocessor with the ability to store data values in the protected memory and read the same values out later. Conventional secure memory schemes are typically used to allow a trusted computational device to access memory that is less secure. In contrast, the CryptoFirewall is designed with the opposite assumption, that the interface control processor is untrusted but attackers do not have direct read/write access to the memory behind the CryptoFirewall. In other words, the CryptoFirewall can allow the cryptographic rights unit to remain secure even if the CRU's main microprocessor is compromised, provided that attackers do not completely breach the firewall and gain unrestricted access to the protected memory.

The CryptoFirewall implements a set of basic operations involved in adding and using content access rights. In the exemplary embodiment described with respect to FIGS. 3, 4, 5, 6, and 7, these operations include adding new rights by prepayment, adding new rights for post-payment, accessing content, auditing/clearing post-paid purchase audit records, and renewing rights. The interface control processor is responsible for supplying data to the CryptoFirewall for each of these commands and assisting with non-security critical tasks.

The exemplary CryptoFirewall uses several keys which are stored in protected memory 265 and loaded during personalization (described below). In one embodiment, the protected memory is an EEPROM containing a device key (CHIP_KEY), at least one group key shared by (for example) 32 cards (BATCH_KEY), a post-payment authorization key (POSTAUTH_KEY), and several rights keys. Portions of the protected memory containing device keys and group keys can be written during personalization, then locked (write protected) to prevent future modification. Alternatively, these values can be stored in ROM, within or accessible by the CryptoFirewall.

Figure 3:
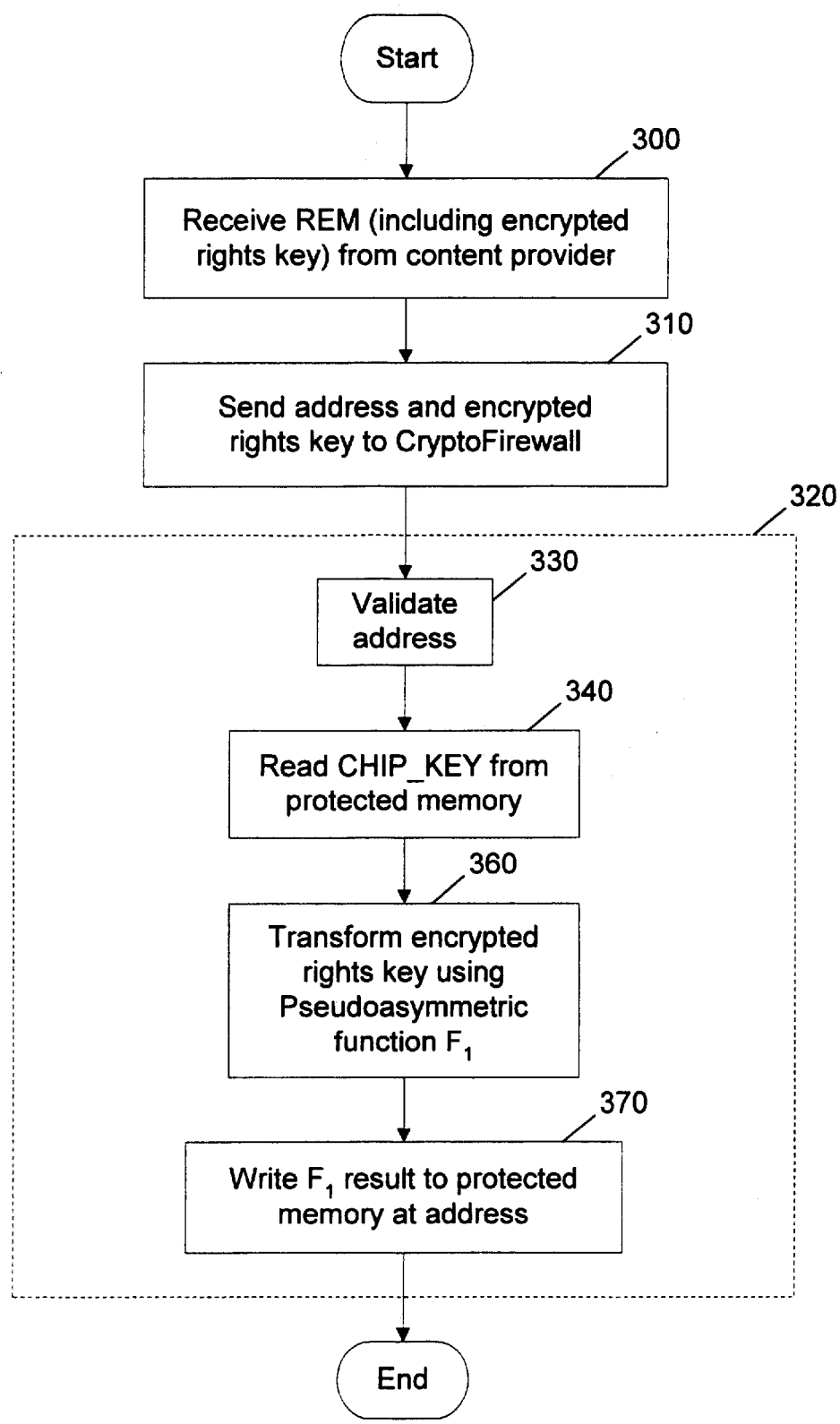
FIG. 3 outlines an exemplary embodiment of a process for adding rights using prepayment.

Adding new rights by prepayment: FIG. 3 outlines an exemplary embodiment of a process for adding rights using prepayment. When a user purchases (or otherwise obtains) permission to use some content, the playback device receives an appropriate rights enablement message (REM) at step 300. The REM is optionally processed and/or validated by the interface control processor, which locates an encrypted rights key in the REM. The interface control processor also selects a destination address in the protected memory. At step 310, the encrypted rights key and address are transferred to the CryptoFirewall, which performs the subsequent processing steps (labeled 320). At step 330, the CryptoFirewall validates that the address specified is valid for storing prepaid rights. At step 340, the CryptoFirewall reads CHIP_KEY (a chip-specific key or device key) from the protected memory. At step 360, the encrypted rights key is transformed using pseudoasymmetric function $F_1$ keyed using CHIP_KEY. At step 370, the CryptoFirewall stores the result of transformation $F_1$ (i.e., the rights key) in the protected memory at the validated address. Note that the process of FIG. 3 can also be used to delete or replace rights keys (e.g., by over-writing them), although key deletion is not essential for broadcast systems (such as cable or satellite television) since content providers can simply stop distributing content protected using expired keys.

Figure 4:
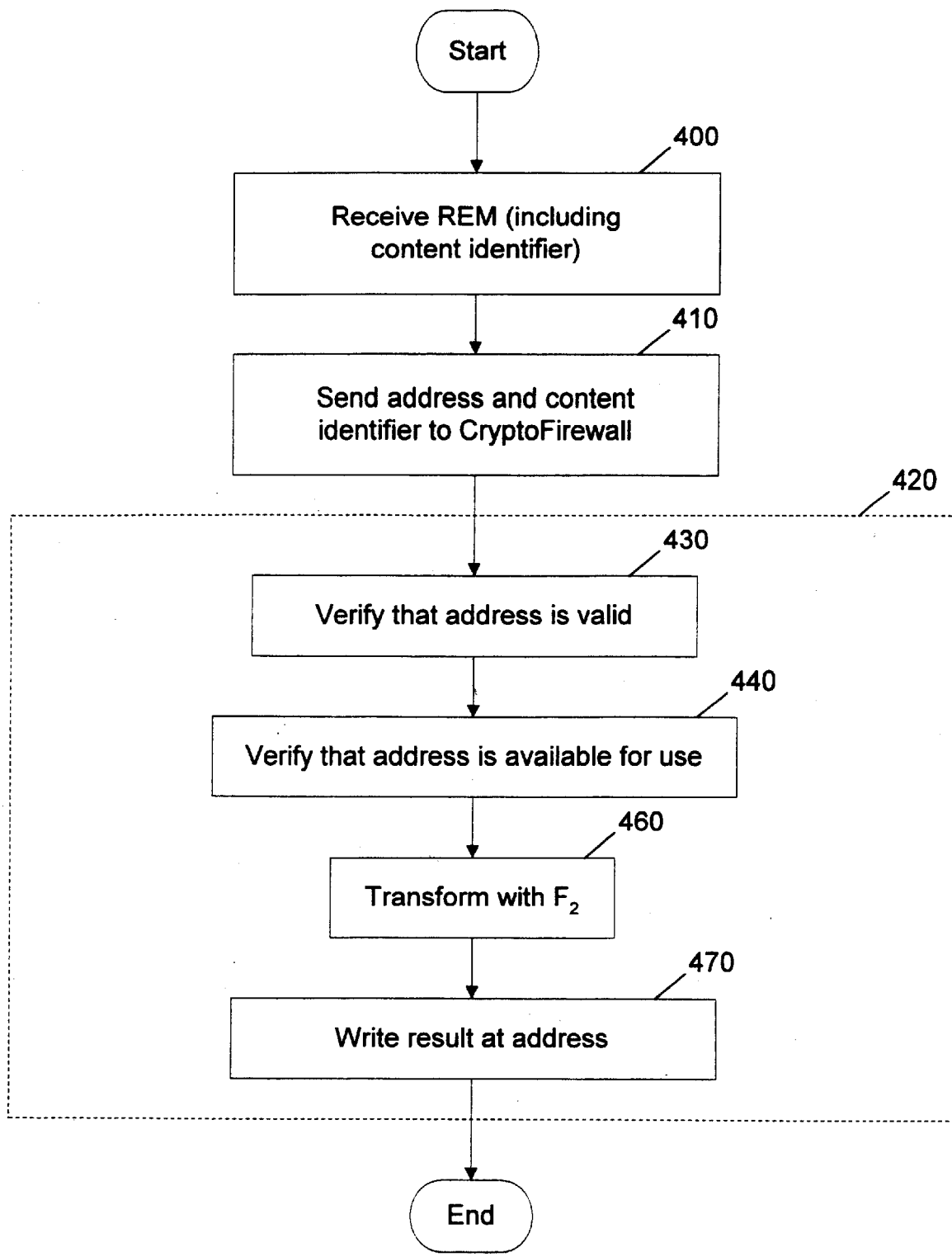
FIG. 4 outlines an exemplary embodiment of the rights addition process using post-payment.

Adding new rights by post-payment: Rights added by post-payment are different from prepaid rights because no explicit communication or prior authorization is available from the content provider. FIG. 4 outlines an exemplary embodiment of the rights addition process using post-payment. When a user wishes to gain access to content on a post-paid basis, the interface control processor obtains at step 400 a rights enablement message corresponding to the content access right to be added. The REM includes an identifier of the content. (The content identifier can be a simple identifier, a randomly produced or cryptographically generated value, a counter, a combination of parameters, etc. and may be generated by the content provider, ICP, playback device, CryptoFirewall, etc.) At step 410, the content identifier and a destination address are passed to the CryptoFirewall, which performs the subsequent processing steps (labeled 420). At step 430, the CryptoFirewall verifies that the address is valid for storing post-paid rights. At step 440, the CryptoFirewall verifies that storing audit data at the specified address will not replace an existing post-payment purchase record in the protected memory. At step 460, the CryptoFirewall uses a pseudoasymmetric function $F_2$ to transform the content identifier. (The function $F_2$ can, for example, be keyed with a post-payment authorization key POSTAUTH_KEY or a global key or, if separate post-payment KDMs are distributed for batches of CRUs, a batch key.) At step 470, the CryptoFirewall stores the result (the rights key) in the protected memory.

Figure 5:
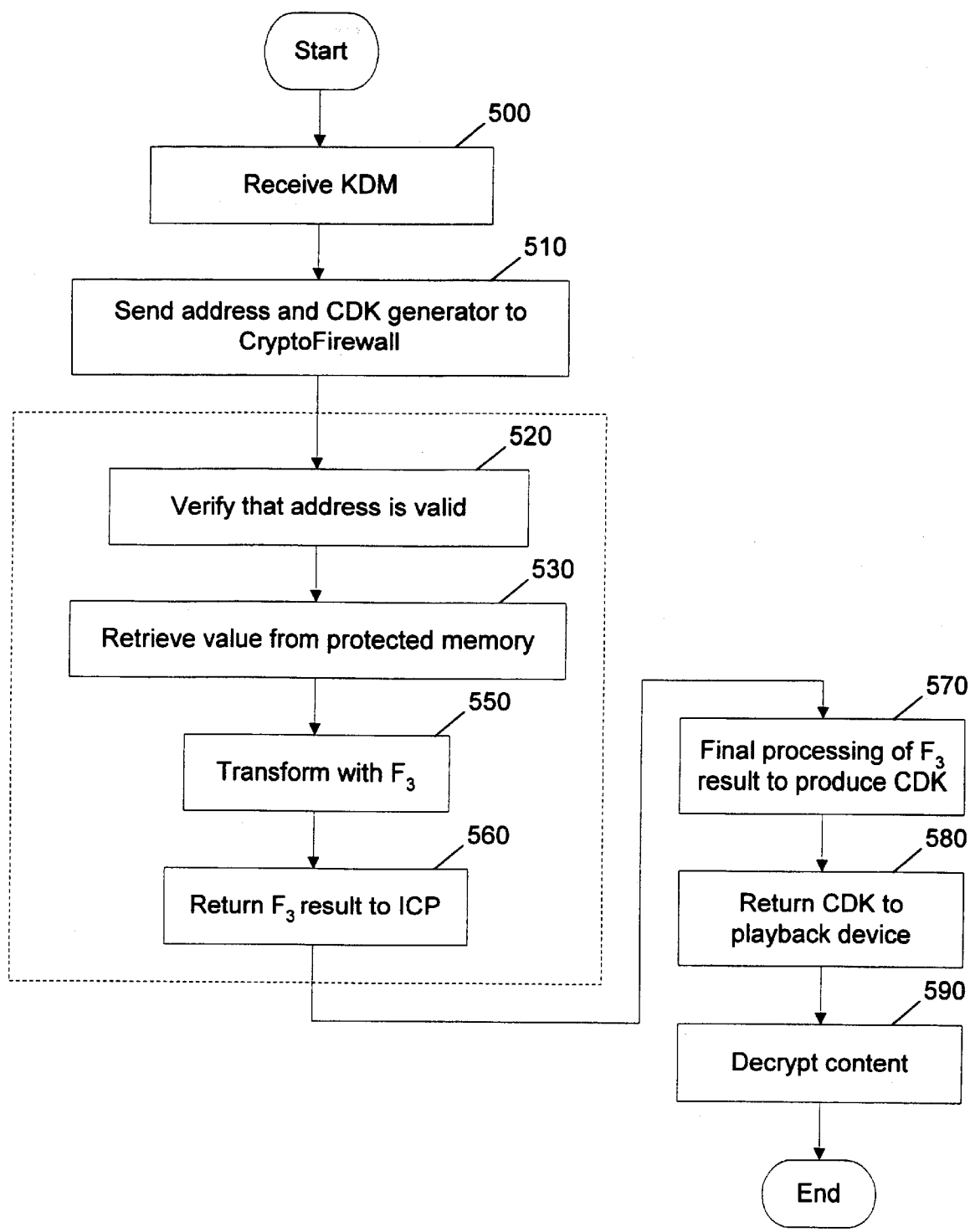
FIG. 5 shows an exemplary method of the present invention for deriving CDKs using rights keys stored in the CryptoFirewall's protected memory.

Accessing content: Before a user can access some content, the playback device must obtain the correct content decryption key (CDK) so that the content can be decrypted. FIG. 5 shows an exemplary method of the present invention for deriving CDKs using rights keys stored in the CryptoFirewall's protected memory. At step 500, the interface control processor (ICP) receives a key derivation message (KDM) from the playback device. At step 510, the ICP uses the KDM to obtain a CDK generator value. (The CDK generator is typically an encrypted form of the CDK and is part of the KDM.) The ICP then sends the CDK generator and an address in the protected memory corresponding to the appropriate rights key to the CryptoFirewall, which performs steps 520 through 560. (To assist with selecting the correct address, the ICP can use its nonvolatile memory to keep track of the rights keys and their locations. The KDM also can identify which rights key is appropriate for processing each CDK generator.) At step 520, the CryptoFirewall verifies that the address is valid, then, at step 530, retrieves the corresponding value (the rights key) from the protected memory. At step 550, the CryptoFirewall uses pseudoasymmetric function $F_3$, keyed with the rights key that was read from the protected memory at step 530, to transform the CDK generator. (In an alternate embodiment, $F_3$ can be keyed with the CDK generator and used to transform the rights key itself Also, $F_3$ does not necessarily need to be a pseudoasymmetric or invertable function. For example, F3 can be a hash ) At step 560, the CryptoFirewall returns the transformation result to the ICP. At step 570, the ICP optionally performs any final processing required to produce the final CDK from the $F_3$ result. At step 580, the ICP transmits the CDK to the playback device, which, at step 590, uses the CDK to decrypt the content.

Figure 6:
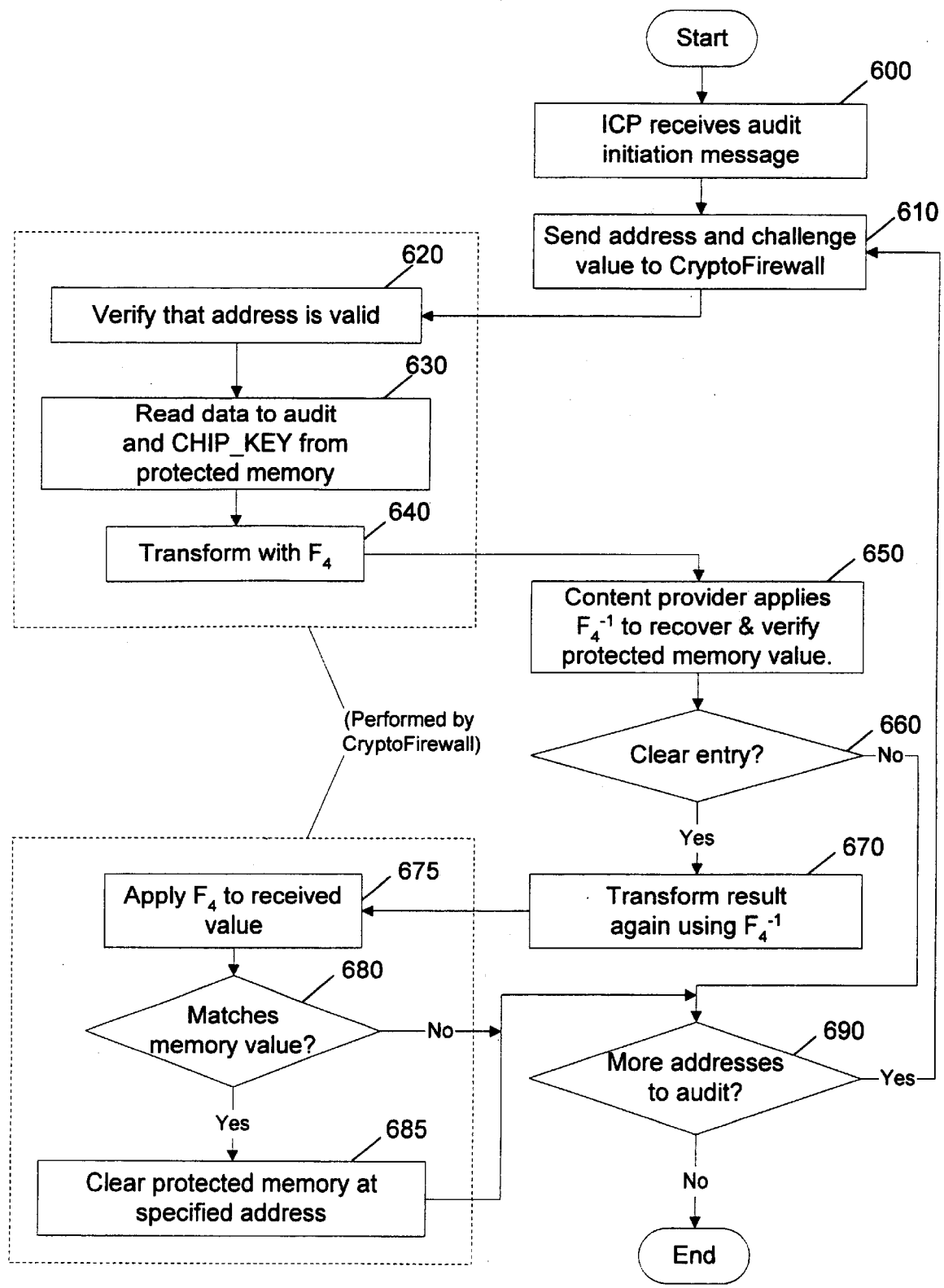
FIG. 6 shows exemplary processes for auditing and clearing audit data.

Auditing and Clearing Post-Payment Rights: A secure audit process is required to allow the content provider to charge users for post-payment purchases. To perform an audit, the content provider must be able to receive data from the cryptographic rights unit, for example through a modem or computer network connection with the playback device. The audit process can be controlled by the interface control processor, which in turn communicates with the CryptoFirewall. FIG. 6 shows exemplary processes for auditing and clearing audit data. At step 600, the content provider transmits an audit initiation request message to the interface control processor. (The process used to initiate audits is implementation-specific. For example, the CryptoFirewall or ICP can alternatively notify the playback device that an audit is needed so that the playback device can establish a connection with the content provider. In another embodiment the content provider can, broadcast a message to the CRU requesting that it perform an audit. In another embodiment, the content provider can directly establish a connection with the CRU or playback device.) The exemplary audit initiation message includes an unpredictable and/or unique challenge value generated by the content provider. At step 610, the CryptoFirewall receives an address value and the challenge value corresponding to a first address to audit. At step 620, the CryptoFirewall verifies that the address is valid for auditing. At step 630, the CryptoFirewall retrieves the contents of the protected memory corresponding to the specified address and a device key (e.g., CHIP_KEY). At step 640, the CryptoFirewall combines the memory contents and the address (for example by concatenating them or replacing part of the memory contents with the address) and transforms the result using pseudoasymmetric function $F_4$ keyed with the CHIP_KEY XORed with the challenge value. The ICP then receives the $F_4$ result and sends it to the content provider via the playback device. At step 650, the content provider uses $F_4^{-1}$ (the inverse of $F_4$) keyed with the CRU's CHIP_KEY XORed with the challenge value to determine the actual contents of the memory at the specified address. Because $F_4$ is pseudoasymmetric and keyed using the CHIP_KEY, the content provider (and only the content provider) should be able to perform $F_4^{-1}$. Unless an attack or computational error has occurred, the decryption result should correspond to either an unused (empty) post-paid rights slot or a rights key for content sold on a post-payment basis. At step 660, the content provider decides whether to clear the slot that was audited. (Post-payment purchase records that are no longer needed by the CRU should be cleared to make room for new purchases.) If no clearing is to be performed, processing continues at step 690. Otherwise, at step 670, the content provider applies $F_4^{-1}$ again (keyed using CHIP_KEY) to the result of the first $F_4^{-1}$ transformation. The result is transferred to the CryptoFirewall via the playback device and the ICP. At step 675, the playback device applies $F_4$ (keyed using CHIP_KEY) to the value received. At step 680, the playback device compares the result with the value read from the protected memory at step 630. If the values match, the CryptoFirewall performs step 685 and clears the protected memory slot. At step 690, the audit process repeats back to step 610 if more addresses in the protected memory need to be audited. Otherwise, the audit process concludes. After a successful audit, the content provider performs post-audit actions such as charging the customer for purchases and refreshing pre-paid keys in the CRU. If the audit fails or indicates inappropriate (or unknown) values in the protected memory, actions might include terminating service to the playback device (or CRU), requiring the user to return the CRU for replacement, billing the user for noncompliance, and/or sending messages to cause the CRU to disable itself. The embodiment shown in FIG. 6 is exemplary; alternative embodiments can, for example, perform auditing before audit record clearing begins, use risk management techniques in the CryptoFirewall to require audits and determine when they should occur, corrupt audit records if audit clearing authorizations are invalid, accumulate a hash of the audit data in the protected memory so that insecure memory can be used to store audit records, modify protected memory fields during the auditing process as well as during the record clearing process, etc.

Figure 7:
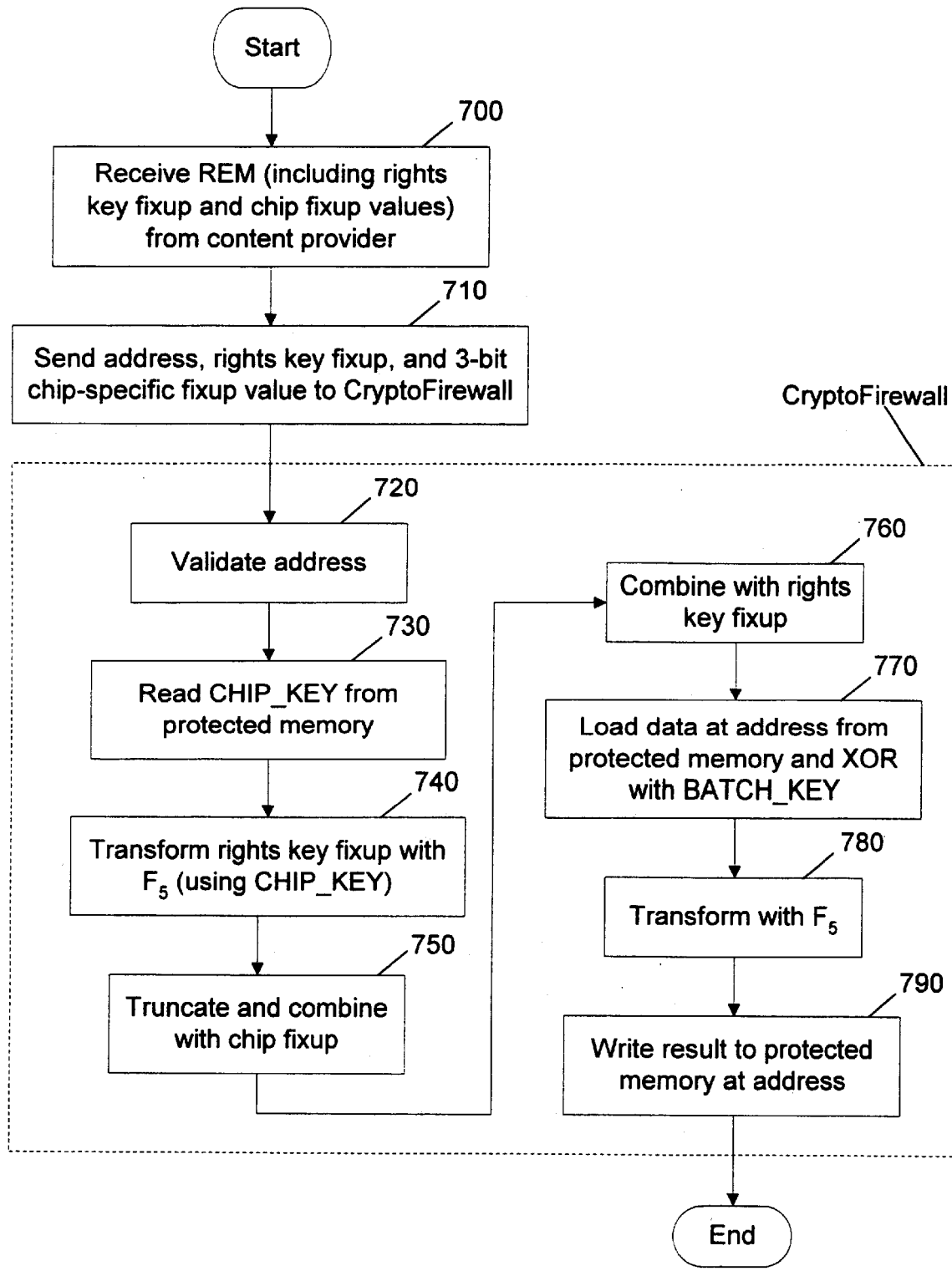
FIG. 7 diagrams an exemplary multi-targeting technique of the present invention and shows how it can be used to renew rights keys.

Multiple Targeting: In some environments, it may not be feasible to broadcast different REMs to all users. For example, if REMs are distributed with content stored on optical discs, broadcast by radio, or sent via satellite, the data required for REMs is typically distributed to all users. As a result, the bandwidth and cost for distributing REMs increase as the system grows larger and can eventually become prohibitive. It is possible to reduce the amount of REM data by allowing multiple authorized CRUs to use each REM. FIG. 7 diagrams one exemplary multi-targeting technique of the present invention and shows how it can be used to renew rights keys. At step 700, the playback device receives a REM, which includes a rights key fixup value encrypted with a key shared by a batch of CRUs as well as several smaller (e.g., 3-bit) chip-specific fixup values. For example, if a BATCH_KEY is shared by 256 CRUs, a separate 3-bit chip fixup value is included for each of these CRUs authorized to use the REM. At step 710, the CryptoFirewall receives the rights key fixup value, the address to update, and the chip-specific fixup value designated for this CRU. At step 720, the CryptoFirewall validates the address received from the interface control processor to ensure that it corresponds to an updateable key in the protected memory. At step 730, the CryptoFirewall reads the CHIP_KEY from the protected memory. At step 740, the CryptoFirewall uses pseudoasymmetric function $F_5$ keyed with CHIP_KEY to transform the rights key fixup value. At step 750, the $F_5$ result is truncated or compressed to a 3-bit quantity and the truncated value is combined with the 3-bit chip-specific fixup value received at step 710. (The combining can be done, for example, by XORing the two 3-bit values together, adding them modulo 8, etc.) Note that the result of step 750 will match a value chosen by the content provider if the chip-specific fixup value is correct, but otherwise produce a different value. An attacker who attempts to guess the chip-specific fixup value will cause the result of step 750 to be incorrect ⅞ (87.5 percent) of the time. At step 760, the 3-bit result of step 750 is combined with the rights key fixup value received at step 710, for example by XORing the result of step 750 onto the first 3 bits of the rights key fixup value. At step 770, the CryptoFirewall reads from the protected memory the data at the address received at step 710 and XORs with the BATCH_KEY. (If the BATCH_KEY is stored in the protected memory, it is also read at this step.) At step 780, the CryptoFirewall transforms the result of step 760 using pseudoasymmetric function $F_5$, keyed with the result of step 770. Finally, at step 790, the result is written to the protected memory at the specified address. Because the attempts to perform an unauthorized key update will corrupt the key most of the time (i.e., with probability $2^{-k}$ for a k-bit chip-specific fixup value), attackers will not be able to perform unauthorized key updates with a high enough success rate to produce a commercially-viable attack. Note: another embodiment of group targeting is described below with respect to FIGS. 10 and 11. Many variants of the embodiment shown in FIG. 7 are also possible; see (for example) the section below entitled "Variations."

Personalization

During personalization, keys including the CHIP_KEY and BATCH_KEY are added. If manufacturing processes allow, these keys can be stored in the CryptoFirewall during manufacture, for example by blowing on-chip fuses. They can also be stored in the protected memory, but care should be taken, however, to prevent attackers from being able to store key values from one CRU in another. Methods usable to prevent such attacks include preventing write access to the key regions after personalization (e.g., by blowing a write-protect fuse), cryptographically regulating access to these regions, and disabling either bit clearing or bit setting operations to prevent attackers from transforming one key into another. (Valid keys can be chosen with equal numbers of set and clear bits to ensure that key changes will require both setting and clearing bits.) It is even possible to allow modification of the keys, provided that changes performed using non-invasive attacks have a high probability of corrupting the key without producing useful results.

Pseudoasymmetric Function Generation

Pseudoasymmetric functions are included in preferred architectures as they can help limit the consequences if a single device is compromised. Cryptographic protocols alone (without hardware tamper resistance) cannot prevent many attacks against broadcast content distribution systems, since an unauthorized replica of an authorized playback system will be able to decode signals. As a result, the hardware implementation should be difficult to reverse engineer or clone.

In one embodiment, a pseudoasymmetric algorithm is produced using a software-implemented generator. The generator constructs a randomized algorithm using data from a random number source, such as a true random number generator, a pseudorandom number generator (such as a stream cipher), a pre-computed randomized input file, etc. The generator uses the random data to automatically design a hardware circuit that performs a cryptographic transformation. The purpose of the random source is to ensure that the circuit construction and the function it performs are unknown to attackers.

Figure 8:
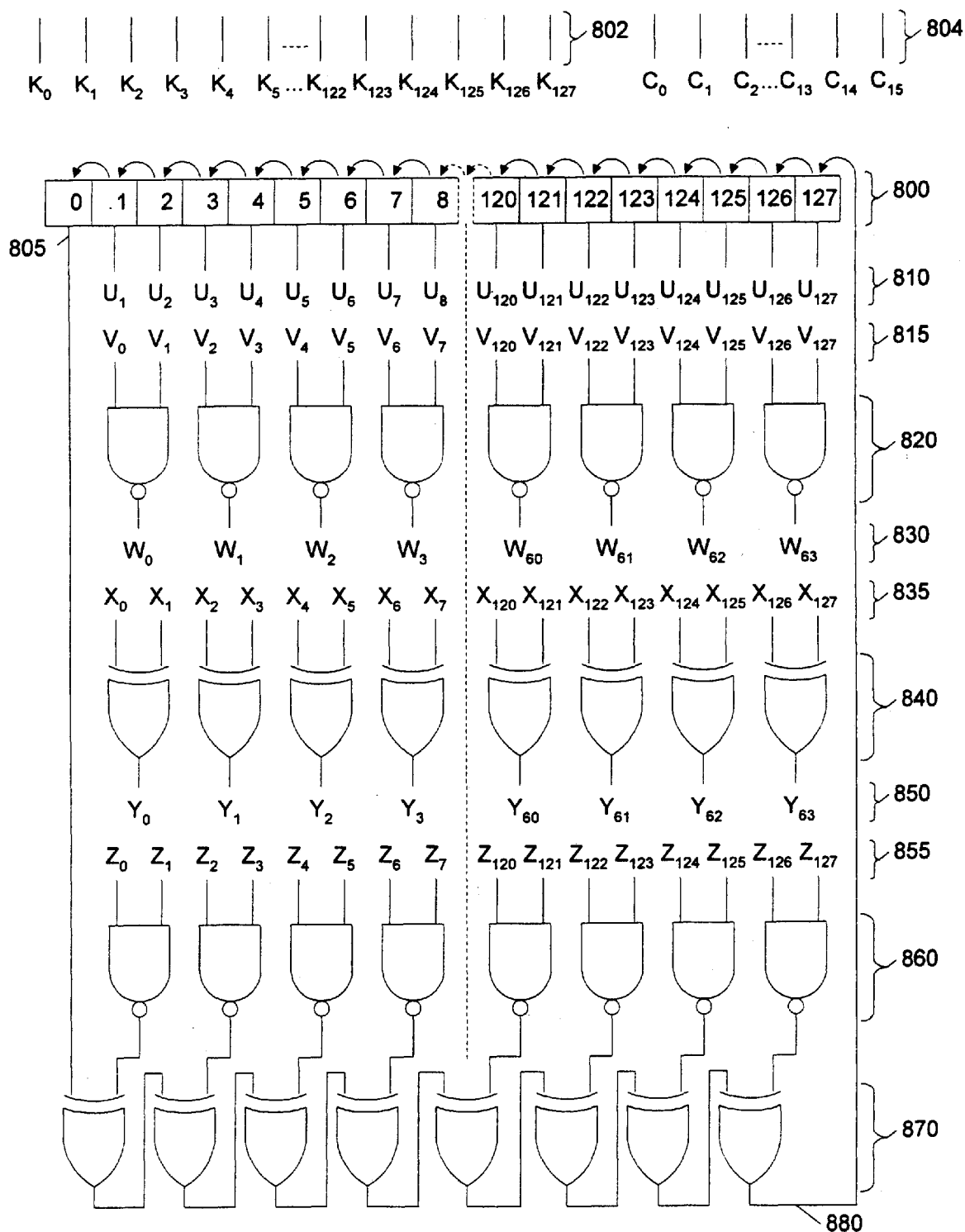
FIG. 8 illustrates one embodiment of a pseudoasymmetric function generator (PAFG) of the present invention.

FIG. 8 illustrates one embodiment of a pseudoasymmetric function generator (PAFG) of the present invention. The input message is stored in a 128-bit shift register 800. The contents 810 of shift register bits 1 through 127 are labeled $U_1$ through $U_{127}$. In addition, the 128-bits of a permutation selector (key) K are also available as $K_0$ through $K_{127}$ (labeled 802) and a clock cycle counter C is available as $C_0$ through $C_{15}$ (labeled 804). The computation circuit includes a series of sixty-four NAND gates 820 having inputs $V_0$ through $V_{127}$ (labeled 815). For each NAND gate, the PAFG uses its random source to randomly select one input bit from $U_1$ through $U_{127}$ and to randomly select the other input bit from among $C_0 \ldots C_{15}$, $K_0 \ldots K_{127}$, and $U_1 \ldots U_{127}$. (To ensure that the transformation in this exemplary embodiment is a permutation, the leftmost shift register bit, labeled 805, is not used here.)

The outputs of NAND gates 820 are labeled $W_0$ through $W_{63}$. Each of these is connected to one or more of $X_0$ through $X_{127}$ (labeled 835), where the specific choice of connections is made by the PAFG. The remaining inputs to XOR gates 840 are connected to randomly-selected bits from $C_0 \ldots C_{15}$, $K_0 \ldots K_{127}$, and/or $U_1 \ldots U_{127}$. The XOR gate outputs 850 (labeled $Y_0$ through $Y_{63}$) are connected by the PAFG to inputs randomly selected from $Z_0$ through $Z_{127}$ (labeled 855). The remaining inputs to the final set of NAND gates 860 are selected from among $C_0 \ldots C_{15}$, $K_0 \ldots K_{127}$, $U_1 \ldots U_{127}$, $W_0 \ldots W_{63}$, and $Y_0 \ldots Y_{63}$. Finally, the outputs of NAND gates 860 and the original 128-bit shift register's left-hand bit 805 are XORed together by XOR gates 870, producing a single-bit result 880. The 128-bit shift register 800 is then shifted left one position (i.e., storing the contents of bit 1 into bit 0, bit 2 into bit 1, but 127 into bit 126, etc.)

and the single result bit 880 is placed in bit position 127. To transform an input block, the operation shown in FIG. 8 is performed repeatedly with a corresponding increment or update to clock counter 804 after each operation. The key 802 can also be updated, for example by transforming it with a maximal-length shift register. The number of iterations performed is implementation-specific and may be variable, depending on factors such as performance requirements and the quality of the mixing function.

Of course, the implementation illustrated in FIG. 8 is substantially simplified, since a real hardware implementation could be comprised of many thousands of gates. In addition, the exemplary embodiment uses only two types of gates (XOR and NAND), but other logic operations may be employed in addition or instead. Additional inputs may also be incorporated into the computation or some inputs may be omitted (such as the counter C).

FIG. 8 uses a 128 bit to 1 bit basic transformation function, but other embodiments may also use other constructions for the transformation. For example, the constructed function can have a Feistel structure (which may be balanced or unbalanced). Constructions without the regularity of a Feistel or shift register may also be used (and may be advantageous since attacks such as microprobing the circuit for computation intermediates can made more difficult if there are a large number of interrelated internal intermediates). Even though it is usually advantageous that the pseudoasymmetric function be a permutation; some embodiments may produce functions that are not strict permutations. Although the embodiment shown in FIG. 8 uses two input parameters (a data block and a key block), alternate embodiments can combine these, eliminate the key, or include additional parameter values.

In some CryptoFirewall embodiments it is advantageous to use multiple pseudoasymmetric functions to ensure that outputs from one operation cannot be used to attack other operations. To reduce the size of an implementation, it is possible to share many or all logic components between these functions. A single transformation circuit can provide multiple operations if a transformation selector is used. For example, a 3-bit function identifier placed in the most significant 8 bits of the counter in $C_0 \ldots C_{15}$ shown in FIG. 8 could provide for eight separate transformation operations.

The output of the PAFG can have any form, but is typically a circuit representation that can be included directly in an application-specific integrated circuit (ASIC). For example, standard languages (such as Verilog and VHDL) for designing integrated circuits may be used as the output format. Additional automated or manual modification of the output (such as adding basic structures around the function, optimizing the operation, etc.) can be performed if required.

In a preferred embodiment, the PAFG also outputs a circuit definition for the inverse function in addition to the "forward" function. A hardware implementation of the forward function is distributed to untrusted parties, for example in the CryptoFirewall, while the inverse is typically managed securely by the content provider(s) and used to prepare content, REMs, KDMs, etc. for distribution. Because the devices that contain the inverse function are operated by the content provider, they can be stored in physically-secure locations. As a result, tamper-resistance is not required, so the inverse may (for example) be implemented in software or in programmable integrated circuits (such as FPGAs).

It is possible for the PAFG to be configurable to produce output tailored to the implementation. For example, output can be tailored to accommodate different circuit description languages, circuit sizes, layouts, logic gate (or logic cell) types, and wiring limitations. For example, in one embodiment, the PAFG is configured to produce a circuit of variable size so that a system designer can select an output circuit whose size corresponds to the amount of space available on a chip's die.

One major advantage of the PAFG architecture is that it can produce circuits that are difficult to reverse engineer while still allowing open cryptographic evaluation. The PAFG itself does not need to contain any secrets because it constructs the output circuit using interconnects and other design parameters generated using a random source. As a result, the PAFG design and implementation can be analyzed—or even published for open review—to assess whether there is any significant chance that the PAFG will generate a cryptographically insecure function. The PAFG architecture thus allows for unrestricted use of outside review and does not require burdensome security precautions on the reviewers typically required when using obfuscated algorithms. The PAFG thus provides resistance to reverse engineering without relying on security by obscurity. (Of course, PAFG implementations that do not use good random sources can be constructed as well, but are not preferred.)

An Exemplary Simplified Architecture

The complexity of the CryptoFirewall described with regard to FIGS. 2 through 7 can be reduced significantly. This section outlines one such simplified architecture that maintains the general memory protection and security features. In the first embodiment presented, the CryptoFirewall supports only prepaid rights, leaving other security features (such as post-payment purchase auditing) to be enforced by the (less secure) ICP. A disadvantage is that attackers who compromise the ICP could potentially erase post-payment audit records, but an advantage is that the CryptoFirewall implementation is significantly simplified.

Figure 9:
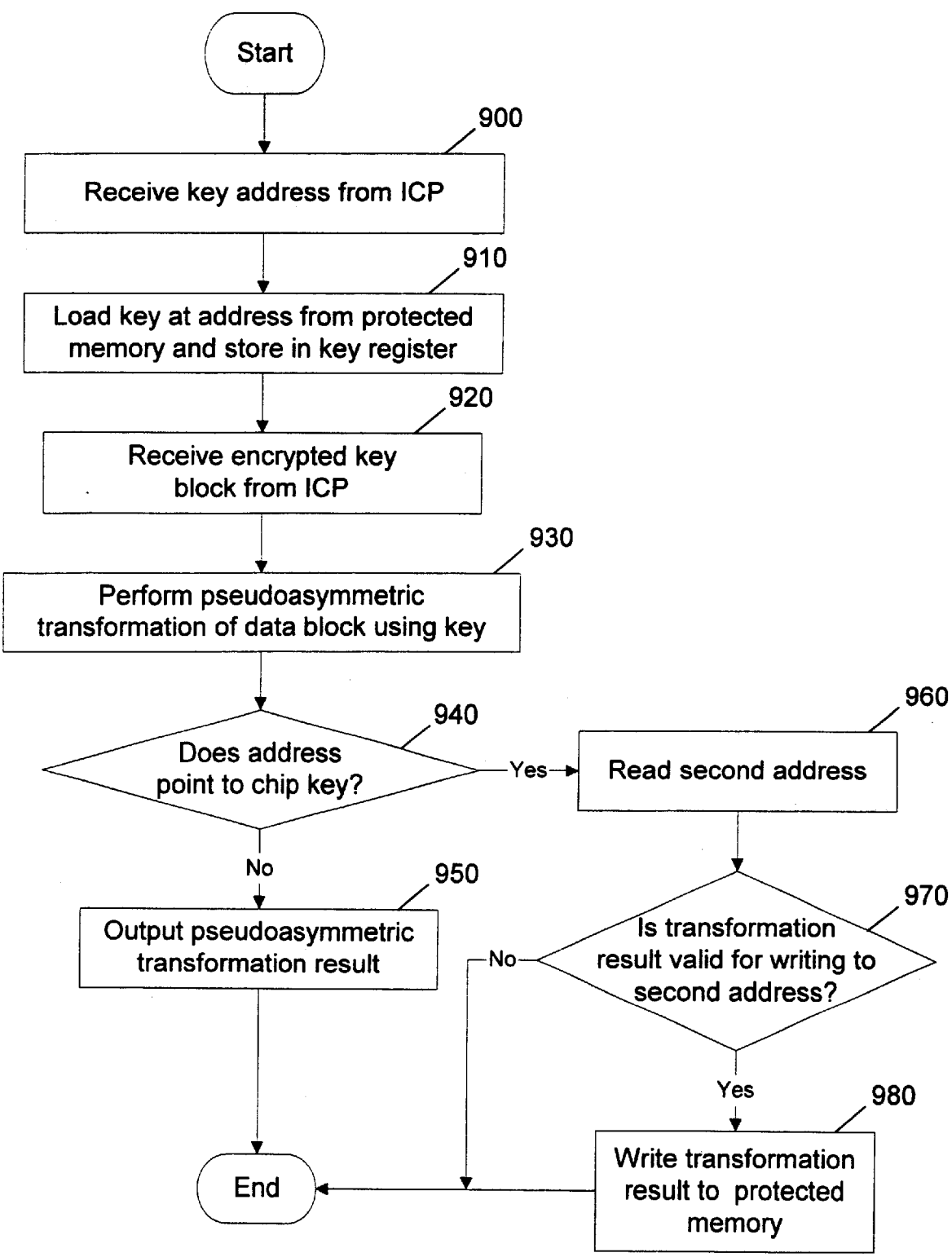
FIG. 9 diagrams the operation of an exemplary CryptoFirewall that implements prepaid rights and can be easily extended to support post-paid rights.

FIG. 9 diagrams the operation of an exemplary CryptoFirewall that implements prepaid rights but can be easily extended to support post-paid rights. The nonvolatile protected memory behind the CryptoFirewall contains a device key (CHIP_KEY) as well as memory locations for storing prepaid rights keys. At step 900, the CryptoFirewall receives a key address from the ICP and makes sure that the address corresponds to a valid key offset in the protected memory. (For example, if keys are 8 bytes long, zeroing the three least significant address bits ensures that the base address is not mis-aligned.) At step 910, the CryptoFirewall loads from the protected memory the data stored at the specified address and places the result in a key register. At step 920, the CryptoFirewall receives a data block from the ICP. At step 930, the CryptoFirewall uses the key read at step 910 with a pseudoasymmetric function to transform the data block obtained at step 920. At step 940, the CryptoFirewall tests whether if the address read at step 900 corresponds to the location of the CHIP_KEY in the protected memory. If not, at step 950, the CryptoFirewall outputs the pseudoasymmetric transformation result to the ICP and concludes. (Results produced using keys other than CHIP_KEY—i.e., rights keys—are used to derive content decryption keys, so the results are not stored. Transformations protected with the CHIP_KEY are used to add new rights keys to the protected memory.) Otherwise, at step 960, the CryptoFirewall reads a second address from the ICP. At step 970, the CryptoFirewall optionally tests whether the result of the transformation is valid for writing at the address specified at step 960 to prevent attackers from inappropriately modifying values in the protected memory. This check is primarily required to prevent over-writing of CHIP_KEY values stored in updateable memory. (For example, before allowing a write to the CHIP_KEY, the CryptoFirewall can verify that the result of the pseudoasymmetric transformation has a pre-defined characteristic—for example, that its first 56 bits equal "10" repeated 28 times.) Alternatively or in addition, the CryptoFirewall should verify that the destination address value is appropriate (e.g., not pointing to the CHIP_KEY). If the CryptoFirewall determines at step 970 that the write is authorized, it performs the write at step 980.

The embodiment of FIG. 9 has the advantage of being very simple, and hence relatively easy to implement and test, but relegates some security tasks (particularly tracking of post-paid purchases) to the ICP. As a result, attackers who compromise the ICP could tamper with post-payment auditing. As noted, the risk of such attacks can be mitigated by requiring the presence of a prepaid rights key to access post-paid content. This prepaid rights key can be updated when an on-line audit completes successfully, thereby preventing devices that have not been audited recently from accessing post-paid content. (Using a "hacked" CRU to perform an audit is relatively risky, particularly if audits suggesting illegal activity can be traced back to specific users through Internet IP addresses, Caller ID/ANI, etc. As a result, the actual and perceived risk can be high enough that attacks on the post-payment audit data will not present a serious piracy threat.)

With a modest addition of complexity, the FIG. 9 architecture can be expanded to include support for post-payment purchases. At step 940, the CryptoFirewall checks whether the address points to the unique chip-specific key or a post-payment authorization key. If neither, processing continues at step 950, as shown. Otherwise, step 960 is performed normally then step 970 is performed as follows:

(a) If the key loaded at step 910 is the post-payment authorization key then the CryptoFirewall tests whether the address received at step 960 corresponds to an empty post-paid rights slot. If it does, the transformation result is written at step 980. (This corresponds to a normal addition of a post-paid rights key.) Otherwise, if the address does not correspond to a post-paid rights slot or if the slot is not empty, no write is performed.

(b) If the key loaded at step 910 is the chip-specific key AND the address received at step 960 corresponds to a prepaid rights slot, then the transformation result is written. (This corresponds to a normal addition of a pre-paid rights key.) The CryptoFirewall can optionally allow replacement of the post-payment authorization key as well (i.e., if the address received at step 960 corresponds to the post-payment authorization key).

(c) If the key loaded at step 910 is the chip-specific key AND the address received at step 960 corresponds to a post-paid rights slot, then the CryptoFirewall tests whether the transformation result from step 930 matches the value of the post-paid rights slot. If there is a match, the memory slot is cleared. Otherwise, no write is performed.

Post-paid rights slots can be designated as empty if all bits are cleared (or set). In this case, the update processes used in (b) and (c) above require only writing (or clearing) bits in the protected memory. If the protected memory uses a technology such as EEPROM where bit clearing and bit setting operations are performed separately, the post-payment addition process can be implemented so that purchasing and clearing each use one type of bit operation.

To audit post-paid purchases, the content provider can (for example) use the standard key generation process and provide a random challenge for the data block at step 920. The output from step 950 is compared with expected values for post-paid purchase keys to identify the key in the protected memory. (Alternatively or in addition, purchase data can be obtained from the ICP or additional logic can be provided in the CryptoFirewall for audits.) Because the audit clearing process is secured using a chip-specific key, attacks that modify audit data will have limited effectiveness. In particular, audit records will only be cleared if the content provider has correct audit data. As a result, the number of purchases that can be performed without paying is limited by the number of post-payment audit record slots in the CryptoFirewall. For risk management, the content provider can initially ship CRUs with only a few empty slots, then gradually clear slots as customers establish their trustworthiness.

Another Exemplary Simplified Architecture

This section outlines a simplified CryptoFirewall architecture that only provides security for pre-paid content purchases. This embodiment has the advantage of being able to use volatile memory instead of writeable nonvolatile memory behind the CryptoFirewall. Because volatile memory is often easier to implement (e.g., because only standard logic components are required), manufacturing and design costs can be reduced.

Embodiments of the present invention that use only volatile memory require access to a unique parameter that cannot be replaced by attackers. This unique parameter is preferably embedded into the circuit, for example using ROM or blown fuses. Techniques for embedding unique parameters in chips are known in the background art. For example, U.S. Pat. No. 5,799,080 to Padmanabhan et al. describes techniques for embedding serial numbers and cryptographic keys in integrated circuits.

Figure 10:
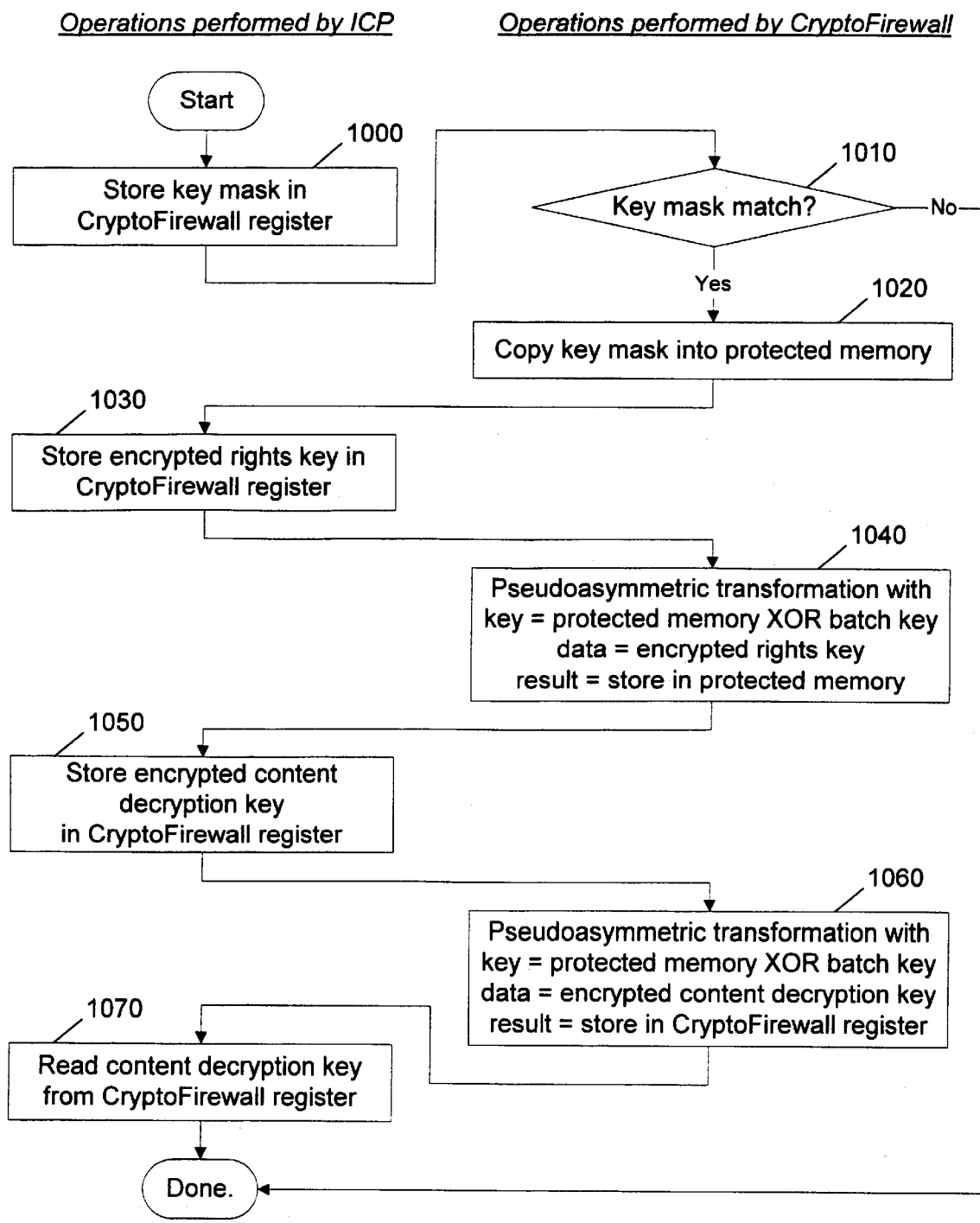
FIG. 10 shows an exemplary CryptoFirewall embodiment using a small volatile protected memory and using batch keys to minimize the bandwidth required for REMs.

FIG. 10 shows an exemplary CryptoFirewall embodiment using a small (for example, 64-bit) volatile protected memory and using batch keys to minimize the bandwidth required for REMs. During manufacture (i.e., prior to the process of FIG. 10). the CryptoFirewall is personalized by permanently embedding a 64-bit BATCH_KEY and a 6-bit BATCH_OFFSET. For example, 64 pairs of fuses may be used to store a 64-bit BATCH_KEY where the personalization process blows one fuse of each pair. To ensure that attackers will not benefit from attacks or manufacturing defects that only connect or only blow fuses, self-test logic can be incorporated to ensure that exactly one fuse of each pair is blown. (Of course, other self-test or verification techniques can also be used. Multiple fuses can also be used to help obfuscate the value of the key bits, for example by making each bit or group of bits the XOR or hash of many fuses.) It is strongly preferable although not strictly required that the combination of BATCH_KEY and BATCH_OFFSET be unique per CryptoFirewall.

In FIG. 10 at step 1000, the interface control processor (ICP) loads a 64-bit key mask value into an externally-accessible 64-bit register in the CryptoFirewall.

At step 1010, the CryptoFirewall verifies that the bit in the key mask corresponding to its BATCH_OFFSET is set. For example, if the CryptoFirewall's embedded BATCH_OFFSET is binary 101110 (46 decimal), the CryptoFirewall will verify that bit 46 of the key mask value is set and, if not, the processing terminates. In an alternate embodiment, the CryptoFirewall sets the bit corresponding to the BATCH_OFFSET if it is not already set. (Of course, alternate embodiments can use encodings other than binary "1" for valid, use other testing processes decrypt or otherwise process the key mask before testing, corrupt the key mask if the BATCH_OFFSET bit is not set, use batch offsets that involve multiple bits in the key mask, use multiple key masks, etc.)

At step 1020, the CryptoFirewall copies the validated key mask value from the input register to the CryptoFirewall's protected memory. The CryptoFirewall can optionally perform some cryptographic processing of the value during this copying.

At step 1030, the ICP loads a 64-bit encrypted rights key into the CryptoFirewall's externally-accessible register. Under normal operation, this key corresponds to some content a user wishes to decode. Encrypted rights keys are normally obtained by the ICP from a REM that was transmitted by the content provider. Because rights keys may last a considerable period of time (e.g., 30 days for a month-long subscription to a cable TV channel), encrypted rights key values can be cached (with the corresponding key mask) in nonvolatile memory external to the CryptoFirewall.

At step 1040, the CryptoFirewall applies a pseudoasymmetric transformation to the encrypted rights key. The pseudoasymmetric transformation is keyed using the XOR of the protected memory contents (i.e., the verified key mask value) and the BATCH_KEY loaded during manufacture. The transformation result is stored in the protected memory, replacing the key mask.

At step 1050, the ICP' stores an encrypted content decryption key in the CryptoFirewall's externally-accessible register. The encrypted content decryption key is typically obtained from a KDM distributed by the content provider with the content to be decoded.

At step 1060, the ICP applies a pseudoasymmetric transformation to the encrypted content decryption key. As in step 1040, the pseudoasymmetric transformation is keyed using the XOR of the protected memory contents (i.e., the decrypted rights key) and the BATCH_KEY loaded during manufacture. The transformation result is stored in the externally-accessible register, where it can be read by the ICP at step 1070 and used to decode the content.

Figure 11:
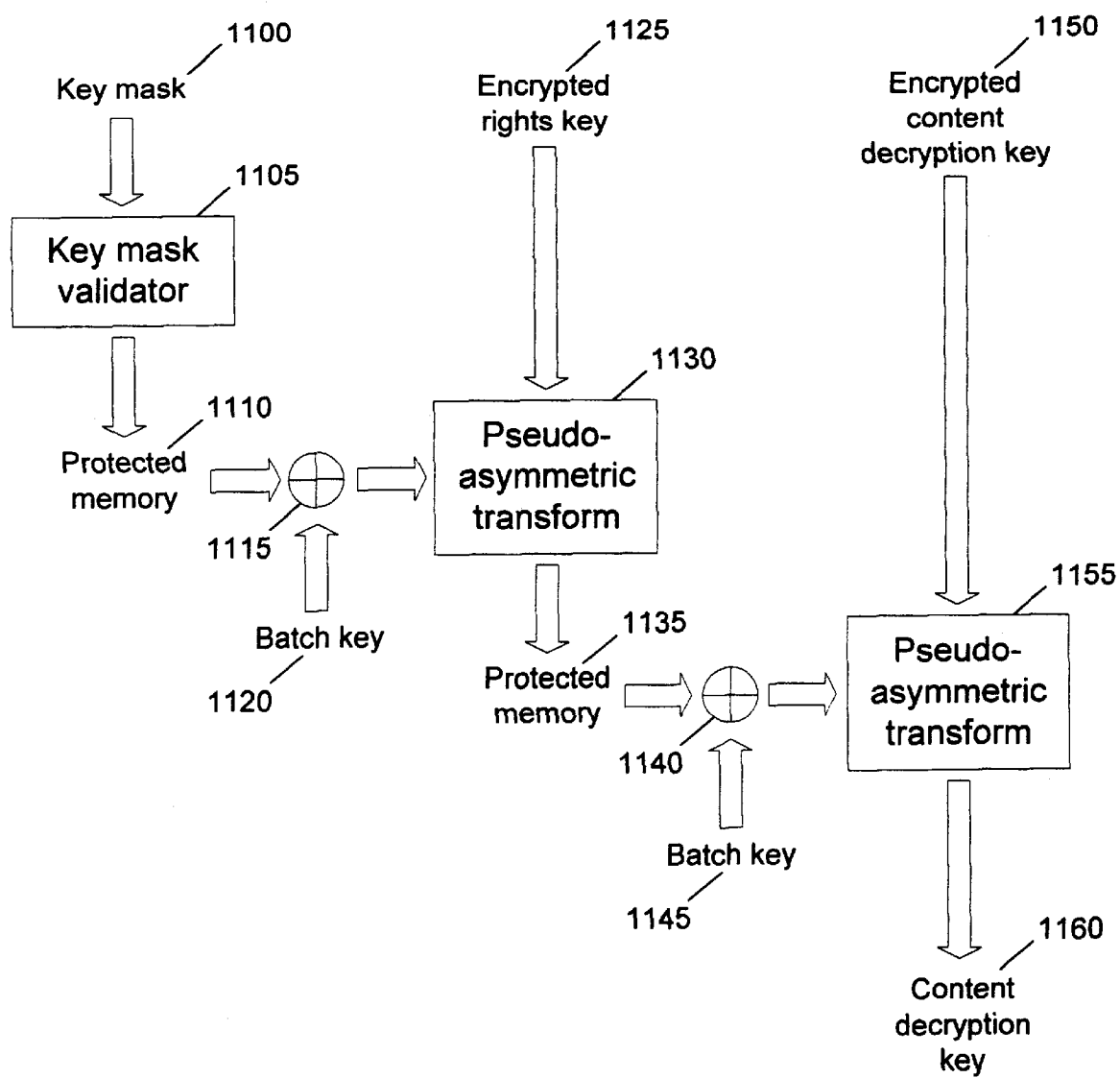
FIG. 11 diagrams the content decryption key computation process of FIG. 10.

FIG. 11 diagrams the same content decryption key computation process. Key mask 1100 identifies which CryptoFirewalls in a batch are authorized to decrypt an encrypted rights key 1125. (Encrypted rights keys are distributed with an associated key mask.) The key mask is checked by key mask validator 1105, which verifies that the CryptoFirewall is among the authorized devices in the batch as specified by the key mask. If valid, a representation of key mask 1100 is stored in protected memory 1110. (If it is invalid, the value is not stored or it is stored in corrupted form.) Combination logic 1115 XORs (or otherwise combines) protected memory contents 1110 with BATCH_KEY 1120 and provides the result as a key to pseudoasymmetric function 1130.

The data input to pseudoasymmetric transformation 1130 is encrypted rights key 1125, which is transformed and the result is stored in protected memory 1135 (which is the same as protected memory 1110). Combination logic 1140 optionally combines BATCH_KEY 1145 (which is the same as BATCH_KEY 1120) with the protected memory contents and provides the result as a key to pseudoasymmetric transformation 1155. Combination logic 1140 is optional; for example, the output of pseudoasymmetric transformation 1130 can be used directly to key transformation 1155. Note that transformation 1155 does not need to be invertable. For example, a keyed hash function such as HMAC can be used instead of a pseudoasymmetric function.

Encrypted content decryption key 1150 is transformed by pseudoasymmetric transformation 1155, yielding content decryption key 1160. (In an alternate embodiment of the invention where the CryptoFirewall directly decrypts the content itself, the content itself or a portion of the content may be supplied instead of encrypted content decryption key 1150.) Note that further processing on the content decryption key 1160 can be performed (e.g., by the ICP, playback device, etc.) before the actual content decryption is performed.

To ensure that operations are performed in the correct order, the CryptoFirewall should keep track of the current state in the transaction processing. For example, the CryptoFirewall should not allow reading of any results until it has completed processing.

To distribute a rights key, the content provider first chooses the value of the rights key and identifies one or more CRUs in a batch that will be authorized receive the key. Next, the content provider constructs a key mask by setting the bits corresponding to the authorized CRUs' BATCH_OFFSET values. From the mask and the BATCH_KEY, the content provider can assemble the output of logic 1115. Using the inverse of pseudoasymmetric transformation 1130 (e.g., as prepared by the PAFG) with the output of logic 1115 as the key, the content provider can compute encrypted rights key 1125 for distribution.

If bandwidth for key distribution is not limited, the batch key capability included in FIGS. 10 and 11 is not required. Instead, device-specific keys can be used and (for example) supplied directly into the pseudoasymmetric transformation in FIG. 10 at step 1040. As a result the CryptoFirewall is somewhat simpler but separate encrypted rights keys need to be distributed for each user. CryptoFirewall architectures can also include both device-specific keys and shared keys.

The architecture of FIGS. 10 and 11 prevents a variety of attacks that involve submitting key masks and/or encrypted rights keys to unauthorized CRUs. For example, if the key mask value is modified in any way (e.g., by setting the bit for an unauthorized CryptoFirewall in the batch), the input to pseudoasymmetric transformation 1130 will be modified, preventing the correct decryption of encrypted rights key 1125. Similarly, if an encrypted rights key from a different batch is submitted, the rights key will also fail to decrypt correctly.

Many variant embodiments are possible. For example, other combination processes (such as encryption, pseudoasymmetric transformations, modular addition, etc.) can be substituted for XOR logic 1115 or logic 1140 in FIG. 11. Combination function 1115 can be omitted altogether or replaced with concatenation if pseudoasymmetric transformation 1140 takes a large enough key. Specified parameter sizes are exemplary. For example, 160-bit keys can be used to provide better security than 64-bit keys against some attacks. Larger key mask sizes can increase efficiency of bandwidth use. Operations can be reordered and additional transformations can be added. (Additional variations are described below in the section entitled "Variations".)

Physical Implementations

The physical implementation of the CRU can have several forms. A preferred implementation involves combining the interface control processor (as well as its memory) with the CryptoFirewall and protected memory on a single chip, which is then placed in a smartcard or PCMCIA card (PC card). Because the CryptoFirewall security model does not assume that the interface control processor (ICP) is completely secure, the CryptoFirewall should be implemented in hardware separate from the ICP, for example as a separate circuit on the same integrated circuit.

The protected memory used by the CryptoFirewall can be separate from, or part of, nonvolatile and/or volatile memory accessible by the ICU. If the CryptoFirewall and ICP share memory regions, the CryptoFirewall is responsible for ensuring that the ICP cannot inappropriately access the protected memory without the required cryptographic transformations. In particular, the CryptoFirewall should intercept and process accesses to protected regions while allowing other accesses to pass through it.

The CryptoFirewall architecture can be combined with hardware and chip card security features known in the background art. For example, detectors can be included to reset the device if unusual operating conditions (such as high/low operating voltage, high/low temperature, high/low/irregular clock signals, radiation, etc.) are encountered. Tamper-resistant coatings, chip obfuscation techniques, conventional memory encryption techniques, error detection/correction logic, intrusion detectors, etc. can also be used. If potential attacks are detected, the CryptoFirewall can (for example) erase any internal registers, reset itself, reset the ICP, and optionally even erase the protected memory.

The CryptoFirewall may be implemented using dedicated hardware (discrete logic) or using a separate microprocessor. In one preferred embodiment, two microprocessors (each with its own RAM, ROM, and EEPROM) are integrated onto a single chip, which is then embedded in smartcard packaging. One microprocessor serves as the ICP and communicates with the second microprocessor which is the CryptoFirewall. Although a dual-microprocessor CRU is somewhat more expensive to manufacture than the single-microprocessor CRUs in use today, it has the important advantage that the inner microprocessor (CryptoFirewall) is shielded from many attacks by the outer microprocessor.

The clock signal used to drive the CryptoFirewall can be taken from (or derived from) an external clock interface, generated internally, or supplied by the ICP. If present, clocks derived internally by the EEPROM circuit for timing write operations can also be used. External clocks should be used with caution to ensure that disruptions in the clock signal will not cause computation errors that could be used to attack the circuit. Clock dividers and multipliers can also be used.

The CRU of the present invention can be implemented in a wide variety of forms. For example, components 210, 270, 280, and 225 in FIG. 2 can be physically located in the same unit or can be individual components that communicate with each other. The entire CRU can be implemented in a single chip or using multiple chips enclosed in a tamper-resistant packaging. (Single chips themselves are sufficiently tamper resistant for many systems, although features such as tamper resistant coatings can be included if desired.)

In one preferred embodiment, the entire CRU is implemented in a single smartcard. Alternatively, the CRU can be a PCMCIA card. The CRU can also be a part of the playback device and can be integrated with other portions of the playback system such as bulk decryption, content decompression, and/or output. For security reasons, the CryptoFirewall needs to be an independent circuit from the interface control processor, but can have any form (e.g., a hard-wired circuit, an independent microprocessor, etc.)

The CRU can be integrated into the playback device, providing the benefit of making it more difficult for attackers to capture or insert content decryption keys exchanged between the playback device and the CRU. As a result, some key redistribution attacks can be prevented. (For content whose value is not time-sensitive or for systems operating in jurisdictions where anti-piracy laws are unavailable or unenforced, such attacks are of particular concern. Key redistribution attacks may also become more dangerous as computer networks such as the Internet can provide attackers with new methods for redistributing keys.) Physical integration of the CRU with the playback device has the disadvantage of making it more difficult to replace the CRU if an attack does occur. Alternatively or in addition, the content provider can withhold key derivation messages until they are actually required by the playback device to minimize the amount of time available for attackers to redistribute keys. Playback devices can also halt if keys are not received in a timely fashion.

Preparing Content

Digital content is usually distributed in compressed form. Processes for creating, formatting, and compressing content of different types are well known in the background art. In most situations, content is encrypted after it is compressed, since encrypted material does not compress well. Occasionally, however, compression and encryption are combined or simple encryption is applied before compression.

The key(s) used to encrypt the content are carried in the content's KDMs, which are secured with rights keys distributed in REMs sent to authorized users. KDMs can specify combinations of rights keys required to access content. For example, if two rights keys should be required to access a particular block of content, the content provider can first generate an encrypted key block (e.g., corresponding to encrypted content decryption key 1150 in FIG. 11). The content provider then constructs a KDM instructing the ICP to (for example) process the encrypted content decryption key twice (each time using the process described with respect to FIG. 10) and combine the results (e.g., by XORing them together) to produce the decrypted content decryption key. The content provider also computes the content decryption key and uses it to encrypt the content. Next, the content provider typically associates KDMs with the content, for example by interspersing KDMs at appropriate places in the content or by making other arrangements for the KDMs to be communicated to playback devices. REMs can also be added if they are distributed with the content. Finally, the content is sent to end users.

In an alternative embodiment, the content provider can begin by selecting a content decryption key. This key may be (but is not required to be) random. The content provider then uses the inverse of the CryptoFirewall pseudoasymmetric function to encrypt the content decryption key with a first rights key. If a second rights key is also required to access the content, the content provider can then use a second rights key to encrypt the content decryption key. The content provider then packages the encrypted CDK into a KDM for distribution and encrypts the content.

Content providers can also broadcast "fixup" values in KDMs that can enable CRUs with any of several rights keys to decode the content. In such cases, the ICP typically locates the address of a valid rights key, uses the CryptoFirewall to process an encrypted rights key, and XORs (or otherwise combines) the CryptoFirewall result with the key fixup value to derive the actual content decryption key. For example, if any of three rights keys (K1, K2, and K3) should allow access to some content and the CryptoFirewall key derivation process is denoted $F(K_i,X)$ where X is a data block and $K_i$ is a BLOCK_KEY, the content provider can choose $F(K_1,X)$ as the content decryption key. The KDM can then include $F(K_1,X)$ XOR $F(K_2, X)$ to enable CRUs with only $K_2$ to derive the content decryption key. Similarly, including $F(K_1,X)$ XOR $F(K_3, X)$ allows CRUs with $K_3$ to decode the content. This "either/or" rights key selection operation can be combined with the "and" operation described above to allow the content provider to establish sophisticated rules as to which CRUs can decode content. Fixups can also be used to produce compatibility between CRUs of different types (e.g., during periods where CRUs are being replaced and two versions are supported). Because the key combination rules are secured cryptographically, the KDM parsing and key construction processes can be implemented in the ICP.

It is possible (and often advantageous) to change content decryption keys frequently, for example by requiring a new KDM and a new key for each one-second or one-minute block of content. If desired, blocks can be protected with different combinations of rights keys. To reduce the latency experienced by users when they begin to decode some content, the content provider can make key changes coincide with places where the decompression algorithm can resynchronize. For example, with MPEG-2 compressed video, key changes can be made to coincide with I pictures.

Comments and Considerations

Under the architecture outlined in FIG. 2, the system remains robust even if the ICP and its RAM, ROM, and EEPROM are compromised. This is an extremely important feature of the present design, since these components of a chip are particularly vulnerable to both invasive and non-invasive attacks. The CryptoFirewall controls the addition of rights keys to the protected memory and thereby prevents information obtained from one CRU from providing attackers with the ability to add rights keys to other CRUs without breaking the cryptography or performing an invasive attack. Even if rights keys are compromised, attackers cannot insert them behind the CryptoFirewall.

In order to compromise the system, the attacker must do one of two things: either duplicate the functionality of the CryptoFirewall's pseudoasymmetric transformation or gain the ability to use a CRU's CryptoFirewall for unauthorized purposes. The former attack is prevented by making it difficult to reverse engineer the randomized transformation circuit. In addition, for large deployments, groups of CRUs can contain different pseudoasymmetric functions to reduce the consequences of a successful reverse engineering attack. Use of group-specific keys (such as BATCH_KEY values) to broadcast periodic rights keys (such as hourly or daily keys) can also reduce the consequences of many reverse engineering attacks.

If the CryptoFirewall is implemented properly, a physically-invasive attack should be required to gain unauthorized control over the protected memory. If the CRU is implemented as a single-chip device (such as a smartcard) with reasonable, physical security measures, physically-invasive attacks pose relatively little risk of being performed on a large number of devices because, even after such an attack has been identified, attackers still have to perform the time-consuming and expensive process of decapping, modifying, and remounting each target chip. These techniques also require expensive equipment and have a fairly high chance of damaging the target chip. As a result, most systems will not experience significant amounts of piracy even if attackers discover a physically-invasive attack that breaches the CryptoFirewall.

The architecture does assume that some devices will be attacked invasively, and therefore minimizes the usefulness of the keys and other data that could be obtained. In particular, a physically invasive attack will potentially provide an attacker with the ability to read from and/or write to the protected memory of the compromised device. Embedded keys (such as BATCH_KEY or BATCH_OFFSET) could be read and/or modified. Simply reading the protected memory contents provides no particular value, since the keys stored in the memory are not useful without the algorithms implemented in the cryptographic unit. The ability to write to the memory can, however, enable some significant attacks, since it then becomes possible for the attacker to delete post-payment records, insert new authorization keys, or modify batch offsets. A properly-functioning CryptoFirewall is still required, however, to process these values into content decryption keys. As a result, the attacker's work modifying one chip can yield one fully-functional pirate device, but should not lead to a general attack that can be marketed on a wide scale.

Variations

This section presents several examples of modified embodiments of the present invention, and other variants will be evident to one of ordinary skill in the art.

The present invention may be used in conjunction with other content protection mechanisms. Content can be watermarked to trace compromises, identify copyright owners, etc. Non-cryptographic security measures can be added in the CRU, playback device, etc. and can help by increasing the effort required for an attack. Tamper evidence (in addition to tamper resistance) in the CRU can help to discourage attacks and prosecute pirates.

In addition to providing a "positive" benefit of adding rights, REMs can also have negative effects such as disabling a CRU by deleting or corrupting a rights key. Such negative effects can be implemented by the ICP and/or by the CryptoFirewall. To prevent attackers from blocking all REMs, the content provider can combine KDMs and REMs or make them indistinguishable (e.g., by encrypting them).

Data blocks in KDMs (e.g., such as the data block received by the CryptoFirewall in FIG. 9 at step 920) can have additional meaning to the ICP or CryptoFirewall, such as a code update or self-check. The content provider can also specify to the ICP that it should supply a portion of the ICP's nonvolatile memory as the encrypted CDK or specify other methods for deriving such values. If KDMs do not need to carry new information from the content provider, they can be generated by the CRU, playback device, etc. For example, a timer can be used to generate unique values for the data block used for content decryption. (Implementers of such embodiments may need to be careful, however, to prevent attackers from generating and distributing content decryption keys before the content is actually broadcast.)

The process performed to derive the content decryption key can include multiple rights keys and/or transformations. For example, multiple iterations of the process shown in FIG. 5 can be performed and the results can be XORed, added, concatenated, hashed, or otherwise combined. (The ICP can manage this process.) The output from a first iteration can be used as the input to subsequent iteration(s).

A content provider can, for example, require that CRUs contain multiple rights keys to access some content. For example, a block of content might require a general rights key that is updated frequently (e.g., hourly), a stream-specific rights key, a post-payment purchase authorization key, a post-payment audit key (indicating that a successful audit was performed recently), a region key (to enforce sports programming blackouts or other geographic restrictions), and/or a premium service rights key.

The ICP can be involved in cryptographic computations. For sophisticated KDMs, the ICP can identify and extract the components usable by the CryptoFirewall, manage I/O with the playback device and CryptoFirewall, and combine results to produce valid content decryption keys. The ICP can also perform additional cryptographic processing on REMs and/or CDKs. Although the CryptoFirewall may be designed with the assumption that the ICP is not a trusted part of the system, it does not cause any harm to also include security in the ICP so that attackers will not succeed unless they compromise both. Some security-related operations (such as local blackouts of sporting events) are relatively unlikely to be the focus of concerted attacks and are difficult to implement in dedicated circuitry, and therefore can be performed by the ICP.

Not all data needs to be protected to the maximum possible level of security. Occasional deletions, for example, are usually sufficiently irritating to prevent attacks that do not decode all of the content. Because compression techniques can make even single bit errors disrupt playback, strong protection over just a few percent (or less) of the total content can be sufficient. As a result, adequate security can often be obtained despite challenging bandwidth or performance limits on the CRU or decryption system. Different portions of the content can also use different levels of protection. For example, relatively weak security can be applied to most of the content but much stronger protection can be applied to a small fraction of the material.

Content providers should change rights keys periodically to ensure that users who have lost their authorization cannot access content. For example, if a user terminates a subscription, the CRU may continue to operate unless the rights key is deleted/disabled or mechanisms outside the CryptoFirewall disable access. Content providers can limit the maximum duration of such use by making rights keys expire periodically (e.g., hourly, daily, weekly, monthly, annually, etc.) To ensure that key changeovers do not disrupt legitimate viewers, new rights keys can be distributed before the old ones are discontinued. During the changeover period, content can also be broadcast with KDMs that can operate using both the old rights key and the new one. An additional option is to queue the REM that updates the key until the key change is required. (Such queuing can be done by the playback device, ICP, etc.)

The memory technology used for nonvolatile protected memory does not need to be conventional EEPROM. For example, PROM, flash memory, battery-backed RAM, FeRAM, etc. all provide nonvolatile storage. Embodiments can even use hard drives or other media-based storage systems, although such approaches are generally infeasible due to their high cost and the difficulty of adding sufficient physical security. (Variants where a hard drive, or a portion of the hard drive, is protected can be useful in environments where the data itself must be stored and protected in the CRU.) Volatile protected memory can also be implemented using a variety of techniques, including registers implemented using standard logic, SRAM, DRAM, etc.

Although it is strongly preferable that values stored in the protected memory be cryptographic keys of sufficient length and quality to prevent attacks such as exhaustive search, it is possible to store shorter values. In one extreme case, individual bit flags that correspond to access rights can be stored in the protected memory. Valid REMs cause the CryptoFirewall to set and/or clear rights bits in the protected memory. When producing content decryption keys, the CryptoFirewall tests the value(s) of rights bits (or incorporates these bit values in the cryptographic transformations) so that valid content decryption keys are only produced if the appropriate bit(s) are set. Such embodiments, although possible, involve more risk because invasive attacks will tend to have more severe consequences.

The components of the CRU do not need to be connected by a bus. In fact, eliminating the bus and directly connecting components can have the advantage of increasing the effort required for physically-invasive attacks as buses can be attacked using (for example) microprobing techniques.

CRUs can contain any number of batch keys or device keys. Also, batch keys do not need to be assigned sequentially during the manufacturing process. (In fact, shuffling key assignment can be beneficial to make it more difficult for attackers to obtain cards with identical batch keys.) Batch keys (and other keys) also do not need to be static; they can be replaced or updated using, for example, a key update process such as the one described with respect to FIG. 7. By including keys for multiple independent batches in each CRU, the consequences of an attack against a single CRU (or small number of CRUs) can be minimized since future REMs and KDMs can be protected using keys that were not in the compromised device(s). If a clone is produced, it is possible to replace legitimate cards in the compromised device's batch then discontinue sending REMs for that batch.

Techniques such as those described in "Tracing Traitors" by Benny Chor, Amos Fiat, and Moni Maor (Advances in Cryptology—Crypto '94, Springer-Verlag, August 1994, pp. 257–270) can be used to identify the source of rebroadcast keys. The CRU can also encrypt content decryption keys, for example using an RSA public key corresponding to the playback device's private key or, preferably, using a unique symmetric key shared between the CRU and the playback device added during manufacturing. Such techniques can help prevent key redistribution attacks that involve using keys produced by one CRU in many playback devices. If the CRU has sufficient I/O bandwidth and computational speed, it can decode the content itself.

The pseudoasymmetric transformations can be implemented using (or replaced with) a variety of cryptographic operations. Methods for building randomly-constructed logic operations are described with respect to FIG. 8, but other constructions can be used instead. For example, standard algorithms (such as Triple DES), one-way hash operations, etc. can be substituted. It is also possible to use a combination of functions, such as Triple DES with randomized pre- and/or post-processing to ensure that the cryptographic security is demonstrably as robust as Triple DES. Pseudoasymmetric functions can also be replaced by true asymmetric functions, which can provide better security but require longer messages and take larger circuits to implement (e.g., increasing the cost of the CryptoFirewall).

Although it is generally simplest to have the interface control processor determine which memory addresses to use when storing and using rights keys, addresses can also be chosen by the CryptoFirewall, by the content provider, by the playback device, etc.

If errors occur in the CRU or CryptoFirewall, a failure counter can be incremented and, if the failure counter reaches a threshold value, the CRU may trigger an audit or cease to work. Examples of failures include torn operations (i.e., where processing is interrupted, for example due to a power loss), invalid commands (e.g., where invalid addresses are supplied), attempts to perform excessive numbers of transactions, and incorrect cryptographic parameters (such as failed attempts to clear post-payment audit records).

Communication processes do not need to be real-time. For example, an auditing process can work as follows: The CRU first receives a message broadcast with some content that initiates an audit. The CRU then outputs audit data to the playback device, which queues the data. Next, the playback device sends the audit data to the content provider, for example by broadcasting it using low-speed radio communication. After verifying the audit data, the content provider finally sends post-payment clearing commands with new content broadcasts.

Some steps, such as address verification by the CryptoFirewall, are recommended but may be omitted as they are not always essential. Steps can also be substituted with other operations that are functionally similar. For example, address verification can be performed by forcing invalid addresses to valid values (e.g., by setting or clearing bits in the address to ensure that the address is in a proper range and aligned appropriately). Many steps can also be reordered. For example, the chip-specific portion of the computation described with respect to FIG. 7 can be XORed with the BATCH_KEY computation result instead of with the BATCH_KEY computation input. Many other such simple variants will be evident to one of ordinary skill in the art.

The pseudoasymmetric function generator (and functions it produces) can be used in applications other than content distribution. For example, stored value cards, electronic transit passes, software copy protection, challenge-response authentication tokens, and other applications where low-cost devices must carry secrets can all benefit from secure cryptographic transformation circuits that are difficult to reverse engineer.

The CryptoFirewall can include multiple cryptographic algorithms, some of which can be specific to a given CryptoFirewall or batch, and others that are more general. For example, in a large system with 25 million CRUs, it may be advantageous to minimize the consequences if any individual CryptoFirewall is reverse engineered. As a result, groups of (for example) 100,000 CryptoFirewalls may be constructed with different algorithms. KDMs and/or REMs are transmitted separately to each of the 250 groups.

Any components that include microprocessors can receive code updates. For example, code in the playback device, ICP, or the CryptoFirewall can be updated by the content provider. Code updates should be cryptographically protected (e.g., with digital signatures, MACs, etc.)

To ensure that interrupted memory updates do not compromise security the CryptoFirewall can store memory update data and addresses in a pending-write buffer, set a write-pending bit, perform the write, then clear the write-pending bit. If the write operation is interrupted (e.g., due to a loss of power), the write will either be lost completely or can be completed from the pending buffer when the device is reset. Write operations can be verified to detect errors. Checksums or other verification fields can be included in stored data to detect memory corruption.

All of the foregoing illustrates exemplary embodiments and applications of the invention, from which related variations, enhancements and modifications will be apparent without departing from the spirit and scope of the invention. Therefore, the invention should not be limited to the foregoing disclosure, but rather construed by the claims appended hereto.

We claim:

1. A method for processing a cryptographic secret distributed to a plurality of tamper-resistant devices among a group of devices sharing a group secret but having individually-assigned group offsets, said method comprising the steps of:

(a) at a recipient device within said group, receiving an input value from a party that knows said group secret;

(b) combining at least a portion of said input value, by using at least said individually-assigned group offset corresponding to said recipient device, to produce a group verification result;

(c) if said verification result indicates that said recipient device is contained in said plurality of devices:

(i) retrieving said group secret from a memory;

(ii) deriving said cryptographic secret by performing a cryptographic operation combining said group verification result, said group secret, and at least a portion of said input value;

(iii) deriving a final result by using said cryptographic secret in at least one subsequent cryptographic operation;

(iv) returning said final result; and (d) if said verification result indicates that said recipient device is not contained in said plurality of devices, returning only information that is not usable to derive said final result.

2. The method of claim 1 where said memory is protected to prevent unauthorized access.

3. The method of claim 2 where said unauthorized access includes unauthorized reading.

4. The method of claim 2 where said unauthorized access includes unauthorized modification.

5. The method of claim 2 where said memory is nonvolatile.

6. The method of claim 2 where said memory is encrypted.

7. The method of claim 2 where:

(i) said verification result is the same for all devices in said plurality; and (ii) devices in said group that are not in said plurality produce verification results that are different from said same verification result produced by said devices in said plurality.

8. The method of claim 1 where:

(i) said steps (a) through (d) are performed by a portion of an integrated circuit used to protect pay television signals;

(ii) said final result in said step (c)(iii) is transmitted to a microprocessor contained in said integrated circuit; and (iii) said microprocessor is unable to directly access said memory.

9. The method of claim 1 where said input value is encrypted, and comprising the additional step of decrypting said encrypted input value.

10. The method of claim 1 comprising the additional steps of:

(i) determining whether said input value indicates that said recipient device should self-destruct; and (ii) performing a self-destruction operation if requested.

11. The method of claim 1 where said step (d) includes updating a failure counter stored in a nonvolatile memory.

12. A method for processing a cryptographic secret distributed to a plurality of tamper-resistant devices among a group of devices sharing a group secret but having individually-assigned group offsets, said method comprising the steps of:

(a) at a recipient device within said group, receiving an input value from a party that knows said group secret, where said input value includes at least a group mask specifying said plurality and an encrypted form of said cryptographic secret;

(b) retrieving from a protected memory said group secret and said individually-assigned group offset corresponding to said recipient device;

(c) transforming said input value, by using at least said group secret and said individually-assigned group offset corresponding to said recipient device, to produce a transformation result, such that said transformation result allows determination of said cryptographic secret if, and only if, said individually-assigned group offset corresponding to said recipient device is specified in said group mask;

(d) storing said cryptographic secret in a memory; and (e) using said cryptographic secret in a subsequent cryptographic operation.

13. The method of claim 12 where:

(i) said group mask is a binary sequence of bits;

(ii) each bit corresponds to at least one tamper-resistant device in said group; and (iii) each bit has a binary value specifying whether said at least one device is specified in said group mask.

14. The method of claim 12 where said step (c) includes the substep of combining said individually-assigned group offset corresponding to said recipient device and said group mask to produce an intermediate result, where said intermediate result is equal to said group mask if and only if said recipient device is contained in said plurality.

15. The method of claim 12 where said subsequent cryptographic operation is used to decode digital content.

16. The method of claim 12 where said subsequent cryptographic operation is used to derive a key that enables the decryption of an encrypted television signal.

17. The method of claim 12 where said party from which said input value is received transmits data to said recipient device via a broadcast channel.

18. The method of claim 17 where:

(i) said broadcast channel is a satellite broadcast; and (ii) a result of said subsequent cryptographic operation is used to decrypt a digital video signal.

19. The method of claim 17 where said broadcast channel is a cable television system.

20. The method of claim 17 where said broadcast channel includes broadcast distribution over a computer network.

21. The method of claim 12, where:

(i) said steps (a) through (e) are performed by a cryptographic unit inside said tamper-resistant recipient device;

(ii) said tamper resistant recipient device includes a microprocessor; and (iii) computation intermediates computed by said cryptographic unit, said transformation result, and the contents of said protected memory are inaccessible by said microprocessor.

22. A device for controlling access to digital content, said device comprising:

(a) a first microprocessor with an external interface;

(b) a second microprocessor;

(c) an interface connecting said first microprocessor and said second microprocessor;

(d) a memory accessible by said second microprocessor but inaccessible by said first microprocessor; and (e) instructions for said second microprocessor to cryptographically combine data received from said first microprocessor with at least one secret stored in said memory;

where said first microprocessor, said second microprocessor, said memory, and said interface are integrated onto a single tamper-resistant integrated circuit.

23. The device of claim 22:

(i) where said instructions are stored in a rewriteable memory; and (ii) further comprising instructions for said second microprocessor to:

(A) cryptographically validate the authenticity of requested code updates; and (B) modify said rewriteable memory as specified by said code updates if said validation is successful.

24. The device of claim 23 where:

(i) said requested code updates are received from said first microprocessor; and (ii) said code update validation instructions include instructions for verifying a digital signature on said code update.

25. The device of claim 22 where said second microprocessor includes logic for decrypting said data received from said first microprocessor.

26. The device of claim 25 where said second microprocessor includes logic for determining whether data output by said decryption logic contains a code update request.

27. A method for receiving a cryptographic secret at a recipient device within a plurality of tamper-resistant devices each having individually-assigned group offsets but sharing a group secret, said method comprising:

(a) receiving an input value from a party that knows said group secret;

(b) verifying at least a portion of said input value, by using at least said individually-assigned group offset corresponding to said recipient device, to produce a group verification result;

(c) returning information:

(i) including a representation of cryptographic secret, if said recipient device is an intended recipient of said cryptographic quantity; and (ii) not including a representation of cryptographic secret, if said recipient device is not an intended recipient of said cryptographic quantity; and (d) using cryptographic secret to decrypt an encrypted transmission.

28. The method of claim 27 where said step (c)(i) includes:

(A) retrieving said group secret from a memory;

(B) deriving said cryptographic secret by performing a cryptographic operation combining said group verification result, said group secret, and at least a portion of said input value;

(C) returning said cryptographic secret; and where said encrypted transmission is an encrypted digital television signal transmitted by said party that knows said group secret.

29. A recipient device for processing a cryptographic secret distributed to a plurality of tamper-resistant devices among a group of devices sharing a group secret but having individually-assigned group offsets, said processing device comprising:

(a) an interface configured to receive an input value from a party that knows said group secret;

(b) group verification subunit configured to combine at least a portion of said input value with said individually-assigned group offset to produce a group verification result;

(c) a microprocessor;

(d) a memory:

(i) inaccessible to said microprocessor; and (ii) configured to store said group secret;

(e) a cryptographic computation subunit:
  (i) connected to said memory and said group verification subunit; and
  (ii) configured to produce an output, where said output comprises said cryptographic secret if and only if said recipient device is among said plurality of devices; and (f) an interface:
  (i) connecting said cryptographic computation subunit to said microprocessor; and
  (ii) configured to return said output of said step (e)(ii) to said microprocessor.

* * * * *